_(12)_ United States Patent
Wang et al.

(10) Patent No.: US 9,667,980 B2
(45) Date of Patent: May 30, 2017

(54) CONTENT-ADAPTIVE BACKGROUND SKIPPING FOR REGION-OF-INTEREST VIDEO CODING

(75) Inventors: Haohong Wang, San Diego, CA (US); Khaled Helmi El-Maleh, San Diego, CA (US); Yi Liang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2868 days.

(21) Appl. No.: 11/200,407

(22) Filed: Aug. 9, 2005

(65) Prior Publication Data

US 2006/0204113 A1    Sep. 14, 2006

Related U.S. Application Data

(60) Provisional application No. 60/658,008, filed on Mar. 1, 2005.

(51) Int. Cl.
*H04N 7/18* (2006.01)
*H04N 19/196* (2014.01)
(Continued)

(52) U.S. Cl.
CPC ......... *H04N 19/198* (2014.11); *H04N 19/115* (2014.11); *H04N 19/126* (2014.11);
(Continued)

(58) Field of Classification Search
CPC ......... H04N 19/0003; H04N 19/00066; H04N 19/00248
(Continued)

(56) References Cited

U.S. PATENT DOCUMENTS 5,347,311 A    9/1994    Golin .......................... 348/416
5,978,515 A    11/1999    Katata et al. ................. 382/243
(Continued)

FOREIGN PATENT DOCUMENTS

EP    0892555    7/1998    ............... H04N 7/26
EP    1315380    10/2002    ............... H04N 7/26
(Continued)

OTHER PUBLICATIONS

Chu, Chung-Tao, et al. "Bi-Directional Object-Based Coding in Video Compression at Very Low Bitrate". Columbia University, NY, NY. Proceedings of ICSP'96. pp. 986-989.
(Continued)

*Primary Examiner* — Andy Rao
(74) *Attorney, Agent, or Firm* — Campbell C. Chiang

(57) ABSTRACT

The disclosure is directed to techniques for content-adaptive background skipping for region-of-interest (ROI) video coding. The techniques may be useful in video telephony (VT) applications such as video streaming and videoconferencing, and especially useful in low bit-rate wireless communication applications, such as mobile VT. The disclosed techniques analyze content information of a video frame to dynamically determine whether to skip a non-ROI area within the frame. For example, the skipping determination may be based on content activity, such as ROI shape deformation, ROI motion, non-ROI motion, non-ROI texture complexity, and accumulated distortion due to non-ROI skipping. The skip determination may operate in conjunction with either frame-level or macroblock-level bit allocation.

31 Claims, 13 Drawing Sheets

(51) Int. Cl.

| | | |
|---|---|---|
| *H04N 19/147* | (2014.01) | |
| *H04N 19/172* | (2014.01) | |
| *H04N 19/115* | (2014.01) | |
| *H04N 19/126* | (2014.01) | |
| *H04N 19/132* | (2014.01) | |
| *H04N 19/14* | (2014.01) | |
| *H04N 19/137* | (2014.01) | |
| *H04N 19/154* | (2014.01) | |
| *H04N 19/162* | (2014.01) | |
| *H04N 19/177* | (2014.01) | |
| *H04N 19/17* | (2014.01) | |
| *H04N 19/587* | (2014.01) | |

(52) U.S. Cl.
CPC ......... *H04N 19/132* (2014.11); *H04N 19/137* (2014.11); *H04N 19/14* (2014.11); *H04N 19/147* (2014.11); *H04N 19/154* (2014.11); *H04N 19/162* (2014.11); *H04N 19/17* (2014.11); *H04N 19/172* (2014.11); *H04N 19/177* (2014.11); *H04N 19/196* (2014.11); *H04N 19/587* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 7,724,972 B2 * | 5/2010 | Wang et al. .................. | 382/239 |
| 2003/0095598 A1 | 5/2003 | Lee et al. | |
| 2003/0123751 A1 * | 7/2003 | Krishnamurthy et al. ... | 382/282 |
| 2004/0161034 A1 | 8/2004 | Morozov et al. ........ | 375/240.03 |

FOREIGN PATENT DOCUMENTS

| | | | | |
|---|---|---|---|---|
| JP | H06319134 A | 11/1994 | | |
| JP | H08251583 A | 9/1996 | | |
| JP | 2002271799 A | 9/2002 | | |
| JP | 2002281508 A | 9/2002 | | |
| WO | 9532565 | 11/1995 | ................ | H04J 3/14 |
| WO | 0018130 | 3/2000 | ................ | H04N 7/30 |
| WO | 02085038 | 10/2002 | ............. | H04N 17/00 |
| WO | 04023819 | 3/2004 | ................ | H04N 7/24 |

OTHER PUBLICATIONS

Lin, Chun-Hung, et al. "Content-Based Rate Control Scheme for Very Low Bit-Rate Video Coding". National Chi Nan University, Puli, Taiwan. Jan. 31, 1997. IEEE 1997. pp. 123-133.

He, Zhihai, et al. "A Linear Source Model and a Unified Rate Control Algorithm for DCT Video Coding". IEEE Nov. 2002. pp. 970-982.

Lee, Jeong-Woo, et al. "Bit Allocation for MPEG-4 Video Coding With Spatio-Temporal Tradeoffs". IEEE Jun. 2003. pp. 488-502.

Vetro, Angthony, et al. "Encoding and Transcoding Multiple Video Objects with Variable Temporal Resolution". MERL—Murray Hill, NJ. IEEE 2001. pp. V-21-V-24.

International Search Report and Written Opinion—PCT/US2006/007225, International Search Authority—European Patent Office—Jun. 22, 2006.

Miyaji, S., et al., "A Method for Very Low Bit-rate Video Coding with Synthetic Spatiotemporal Coding Control," The Journal of the Institute of Image Information and Television Engineers, vol. 51, No. 10, Oct. 20, 1997, pp. 1706-1714 (116-124).

* cited by examiner

CONTENT-ADAPTIVE BACKGROUND SKIPPING FOR REGION-OF-INTEREST VIDEO CODING

This application claims the benefit of U.S. Provisional Application No. 60/658,008, filed Mar. 1, 2005.

TECHNICAL FIELD

The disclosure relates to digital video encoding and, more particularly, techniques for encoding region-of-interest (ROI) information for video telephony (VT) applications.

BACKGROUND

A number of different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU) H.263 standard, and the emerging ITU H.264 standard. These video encoding standards generally support improved transmission efficiency of video sequences by encoding data in a compressed manner.

Video telephony (VT) permits users to share video and audio information to support applications such as videoconferencing. Exemplary video telephony standards include those defined by the Session Initiation Protocol (SIP), the ITU H.323 standard, and the ITU H.324 standard. In a VT system, users may send and receive video information, only receive video information, or only send video information. A recipient generally views received video information in the form in which it is transmitted from a sender.

Preferential encoding of a selected portion of the video information has been proposed. For example, a sender may specify a region-of-interest (ROI) to be encoded with higher quality for transmission to a recipient. The sender may wish to emphasize the ROI to a remote recipient. A typical example of an ROI is a human face, although a sender may wish to focus attention on other objects within a video scene. With preferential encoding of the ROI, a recipient is able to view the ROI more clearly than non-ROI regions.

An ROI may be preferentially encoded by allocating a greater proportion of encoding bits to the ROI than to non-ROI, or "background," areas of a video scene. Skipping of a non-ROI area of a video frame permits conservation of encoding bits for allocation to the ROI. The encoded non-ROI for a preceding frame can be substituted for the skipped non-ROI in a current frame. Alternatively, the skipped non-ROI can be interpolated. In either case, skipping encoding of the non-ROI area of a frame permits enhanced encoding of the ROI.

SUMMARY

The disclosure is directed to techniques for content-adaptive background skipping for region-of-interest (ROI) video coding. The techniques may be useful in video telephony (VT) applications such as video streaming and videoconferencing, and especially useful in low bit-rate wireless communication applications, such as mobile VT. The content-adaptive non-ROI skipping may be implemented, in some embodiments, with relatively low complexity.

ROI video coding involves preferential encoding of the ROI, e.g., by allocation of additional coding bits to a ROI within a video frame, and allocation of a reduced number of coding bits to non-ROI areas. The non-ROI areas may be referred to as "background" areas, although a non-ROI area more generally encompasses any area of a video scene that does not form part of the ROI. Accordingly, the terms non-ROI and background may be used interchangeably throughout this disclosure to refer to areas that are not within the ROI.

The disclosed techniques analyze content information of a video frame to dynamically determine whether to skip the encoding of a non-ROI area within the frame. For example, the skipping determination may be based on content activity, such as ROI shape deformation, ROI motion, non-ROI motion, non-ROI texture complexity, and accumulated distortion due to non-ROI skipping in one or more previous frames. The skip determination may operate in conjunction with either frame-level or macroblock-level bit allocation.

Different strategies may be applied to perform bit allocation among regions and frames. A self-learning classification approach based on a Bayesian model may be applied to estimate the number of skipped non-ROI areas in future frames based on the context of motion and non-ROI texture complexity. In this manner, it is not necessary to obtain content information for future frames in order to make a non-ROI skipping decision for a current frame, which would be difficult in a real-time system. In addition, a weighted rate control and bit allocation algorithm may be applied to allocate bits for the ROI and non-ROI areas.

The human visual system (HVS) tends to be more sensitive to temporal changes when a video scene frame contains high motion and more sensitive to spatial details when a video scene contains low motion. Utilizing the HVS model, non-ROI skipping can be avoided during high-motion scenes so that acceptable temporal quality is maintained. By skipping non-ROI areas during low-motion scenes that are less temporally sensitive, however, coding bits can be saved for enhanced ROI coding. In this manner, spatial quality of the non-ROI area can be enhanced.

In one embodiment, the disclosure provides a method comprising obtaining a video frame, encoding a region of interest (ROI) within the video frame, and determining whether to skip encoding of a non-ROI area of the video frame based on content activity of the ROI and the non-ROI area and accumulated distortion due to skipping of encoding of non-ROI areas in one or more other frames.

In another embodiment, the disclosure provides a device comprising a region-of-interest mapper that generates a definition of a region of interest (ROI) within a video frame, a video encoder that encodes the ROI within the video frame, and a skipping module that determines whether the encoder will skip encoding of a non-ROI area of the video frame based on content activity of the ROI and the non-ROI area and accumulated distortion due to skipping of encoding of non-ROI areas in one or more other frames.

In an additional embodiment, the disclosure provides a computer-readable medium comprising instructions to cause a processor to obtain a video frame, encode a region of interest (ROI) within the video frame, and determine whether to skip encoding of a non-ROI area of the video frame based on content activity of the ROI and the non-ROI area and accumulated distortion due to skipping of encoding of non-ROI areas in one or more other frames.

The techniques described herein may be implemented in hardware, software, firmware, or any combination thereof. If implemented in software, the techniques may be realized in part by a computer readable medium comprising program code containing instructions that, when executed, performs one or more of the methods described herein.

The details of one or more embodiments are set forth in the accompanying drawings and the description below. Other features, objects, and advantages will be apparent from the description and drawings, and from the claims.

DETAILED DESCRIPTION

Figure 1:
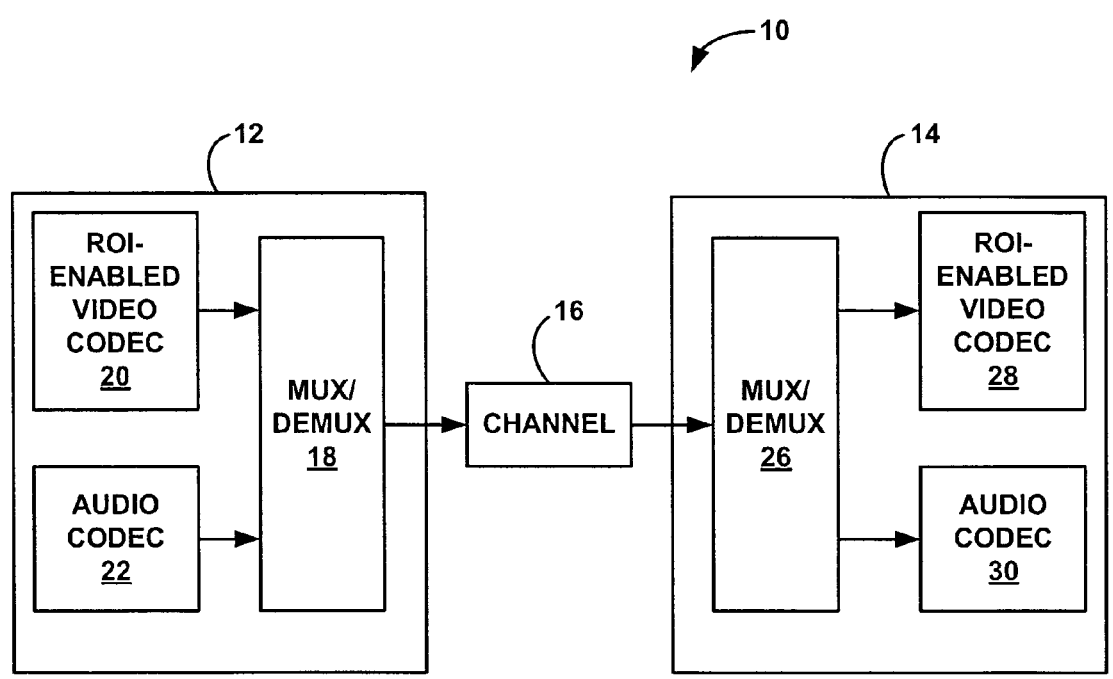
FIG. 1 is a block diagram illustrating a video encoding and decoding system incorporating ROI-enabled video encoder-decoders (CODECs).

FIG. 1 is a block diagram illustrating a video encoding and decoding system 10 incorporating ROI-enabled video encoder-decoders (CODECs). As shown in FIG. 1, system 10 includes a first video communication device 12 and a second video communication device 14. Communication devices 12, 14 are connected by a transmission channel 16. Transmission channel 16 may be a wired or wireless communication medium. System 10 supports two-way video transmission between video communication devices 12, 14 for video telephony. Devices 12, 14 may operate in a substantially symmetrical manner. In some embodiments, however, one or both video communication devices 12, 14 may be configured for only one-way communication to support ROI-enabled video streaming.

One or both of video communication devices 12, 14 may be configured to apply techniques for ROI coding for video telephony (VT), as described herein. ROI video coding involves preferential encoding of the ROI, e.g., by allocation of additional coding bits to a ROI within a video frame, and allocation of a reduced number of coding bits to non-ROI areas. The ROI coding techniques described herein include content-adaptive skipping of non-ROI areas to conserve encoding bits for allocation to the ROI. The content-adaptive skipping techniques involve analysis of content information of a video frame to dynamically determine whether to skip a non-ROI area within the frame on a frame-by-frame basis.

A content-adaptive skipping determination for a frame may be based on content activity within the frame, such as ROI shape deformation, ROI motion, and non-ROI motion, non-ROI texture complexity, and accumulated distortion due to non-ROI skipping in other frames. Texture complexity may be represented as variance. In addition, the content-adaptive skip determination may operate in conjunction with either frame-level or macroblock-level bit allocation. A macroblock (MB) is a video block that forms part of a frame. The size of the MB may be 16 by 16 pixels. However, other MB sizes are possible. Macroblocks will be described herein for purposes of illustration, with the understanding that macroblocks may have a variety of different sizes. In general, macroblocks may refer to video blocks of any size, which together form a video frame.

For two-way applications, reciprocal encoding, decoding, multiplexing (MUX) and demultiplexing (DEMUX) components may be provided on opposite ends of channel 16. In the example of FIG. 1, video communication device 12 includes MUX/DEMUX component 18, ROI-enabled video CODEC 20 and audio CODEC 22. Similarly, video communication device 14 includes MUX/DEMUX component 26, ROI-enabled video CODEC 28 and audio CODEC 30.

System 10 may support video telephony according to the Session Initiated Protocol (SIP), ITU H.323 standard, ITU H.324 standard, or other standards. Each video CODEC 20, 28 generates encoded video data according to a video compression standard, such as MPEG-2, MPEG-4, ITU H.263, or ITU H.264. As further shown in FIG. 1, video CODECs 20, 28 may be integrated with respective audio CODECs 22, 30, and include appropriate MUX/DEMUX components 18, 26 to handle audio and video portions of a data stream. The audio portion may carry voice or other audio content. The MUX-DEMUX units 18, 26 may conform to the ITU H.223 multiplexer protocol, or other protocols such as the user datagram protocol (UDP).

Each ROI-enabled video CODEC 20, 28 may be capable of processing ROI information provided locally by a local user of the respective video communication device 12, 14 or ROI information provided remotely from a remote user of the other video communication device 12, 14. For example, a local user of video communication device 12 may specify an ROI in "near-end" video generated locally by video communication device 12 to emphasize a region of the transmitted video to a remote user of device 14. Conversely, a local user of video communication device 12 may specify an ROI in "far-end" video generated remotely by video communication device 14, and communicate the ROI to the remote video communication device. In this case, the user of video communication device 12 remotely controls preferential encoding of the ROI by video communication device 14, e.g., to more clearly view an ROI in the video received from video communication device 14.

Video communication devices 12, 14 may be implemented as wireless mobile terminals or wired terminals equipped for video streaming, video telephony, or both. To that end, video communication devices 12, 14 may further include appropriate wireless transmitter, receiver, modem, and processing electronics to support wireless communication. Examples of wireless mobile terminals include mobile radio telephones, mobile personal digital assistants (PDAs), mobile computers, or other mobile devices equipped with wireless communication capabilities and video encoding and/or decoding capabilities. Examples of wired terminals include desktop computers, video telephones, network appliances, set-top boxes, interactive televisions, or the like. Either video communication device 12, 14 may be configured to send video information, receive video information, or send and receive video information.

For video telephony applications, it is generally desirable that devices 12 support both video send and video receive capabilities. However, streaming video applications are also contemplated. In video telephony, and particularly mobile video telephony by wireless communication, bandwidth is a significant concern as extremely low bit rates are often required. In particular, communication channel 16 may have limited bandwidth, making the effective real-time transmission of quality video sequences over channel 16 very challenging. Communication channel 16, for example, may be a wireless communication link with limited bandwidth due to physical constraints in channel 16, or possibly quality-of-service (QoS) limitations or bandwidth allocation constraints imposed by the provider of communication channel 16.

Accordingly, selective allocation of additional encoding bits to an ROI, stronger error protection, or other preferential encoding steps, can improve the image quality of a portion of the video while maintaining overall encoding efficiency. For preferential encoding, additional bits may be allocated to the ROI, while a reduced number of bits may be allocated to the non-ROI regions, such as the background in a video scene. The non-ROI areas will be referred to as "background" areas, although a non-ROI area more generally encompasses any area of a video scene that does not form part of the ROI. Accordingly, the terms non-ROI and background may be used interchangeably throughout this disclosure to refer to areas that are not within the specified ROI.

In general, system 10 employs techniques for region-of-interest (ROI) processing for video telephony (VT) applications. However, such techniques also may be applicable to video streaming applications, as mentioned above. For purposes of illustration, it will be assumed that each video communication device 12, 14 is capable of operating as both a sender and a recipient of video information, and thereby operating as a full participant in a VT session. For video information transmitted from video communication device 12 to video communication device 14, video communication device 12 is the sender device and video communication device 14 is the recipient device.

Conversely, for video information transmitted from video communication device 14 to video communication device 12, video communication device 12 is the recipient device and video communication device 14 is the sender device. The techniques described herein may also be applicable to devices that only send or only receive such video. When discussing video information to be encoded and transmitted by a local video communication device 12, 14, the video information may be referred to as "near-end" video, as mentioned above. When discussing video information to be encoded by and received from a remote video communication device 12, 14, the video information may be referred to as "far-end" video.

According to the disclosed techniques, when operating as a recipient device, video communication device 12 or 14 defines ROI information for far-end video information that is received from a sender device. Again, video information that is received from a sender device will be referred to as "far-end" video information in the sense that it is received from the other (sender) device situated at the far end of the communication channel.

Likewise, ROI information defined for video information that is received from a sender device will be referred to as "far-end" ROI information. Far-end ROI generally refers to a region within the far-end video that most interests a receiver of the far-end video. The recipient device decodes the far-end video information and presents the decoded far-end video to a user via a display device. The user selects an ROI within a video scene presented by the far-end video. Alternatively, the ROI may be automatically defined.

The recipient device generates far-end ROI information based on the ROI selected by the user at the recipient device, and sends the far-end ROI information to the sender device so that the sender device can use such information. The far-end ROI information may take the form of an ROI macroblock (MB) map defining the ROI in terms of the MBs that reside within the ROI. The ROI MB map may flag MBs that are within the ROI with a 1, and MBs outside the ROI with a 0, to readily identify MBs included in (1) and excluded from (0) the ROI.

Using the far-end ROI information transmitted by the recipient device, the sender device applies preferential encoding to a corresponding ROI within the video scene. In particular, additional encoding bits may be allocated to the ROI, while a reduced amount of encoding bits may be allocated to non-ROI regions, thereby improving image quality of the ROI. In this manner, the recipient device is able to remotely control ROI encoding of far-end video information by the sender device.

The preferential encoding applies higher quality encoding to the ROI area than to non-ROI areas of the video scene, e.g., by preferential bit allocation or preferential quantization in the ROI area. The preferentially encoded ROI permits the user of the recipient device to view an object or region more clearly. For example, the user of the recipient device may wish to view a face or some other object more clearly than background regions of a video scene.

When operating as a sender device, video communication device 12 or 14 may also define ROI information for video information that is transmitted by the sender device. Again, video information that is generated in the sender device will be referred to as "near-end" video in the sense that it is generated at the near end of the communication channel. ROI information generated by the sender device will be referred to as "near-end" ROI information.

Near-end ROI generally refers to a region of the near-end video that a sender wants to emphasize to a receiver. Hence, an ROI may be specified by a recipient device user as far-end ROI information, or by a sender device user as near-end ROI information. The sender device presents the near-end video to a user via a display device. The user associated with the sender device selects an ROI within a video scene presented by the near-end video. The sender device encodes the near-end video using the user-selected ROI such that the ROI in the near-end video is preferentially encoded, e.g., with higher quality encoding, relative to non-ROI areas.

The near-end ROI selected or defined by a local user at the sender device allows a user of the sender device to emphasize regions or objects within the video scene, and thereby direct such regions or objects to the attention of the recipient device user. Notably, the near-end ROI selected by the sender device user need not be transmitted to the recipient device. Instead, the sender device uses the selected near-end ROI information to locally encode the near-end video before it is transmitted to the recipient device. In some embodiments, however, the sender device may send ROI information to the recipient device to permit application of preferential decoding techniques, such as higher quality error correction or post-processing.

If ROI information is provided by both the sender device and the recipient device, the sender device applies the received far-end ROI information from the recipient device or the locally generated near-end ROI information to encode the near-end video. ROI conflicts may arise between the near-end and far-end ROI selections provided by the sender device and recipient device. Such conflicts may require resolution, such as active resolution by a local user or resolution according to specified access rights and levels. In either case, the sender device preferentially encodes the ROI based on near-end ROI information provided locally by the sender device or remotely by the recipient device.

Given an ROI specified by either a local user or a remote user, this disclosure generally focuses on techniques for content-adaptive skipping of non-ROI areas of a video frame. The content-adaptive skipping techniques may be applied in conjunction with a variety of additional ROI coding techniques, many of which will be described herein for purposes of illustration and context.

For example, this disclosure also addresses the manner in which an ROI is preferentially encoded, in terms of bit allocation between ROI and non-ROI areas within a video scene. In some embodiments, an ROI video quality metric may be applied to bias a weighted bit allocation between ROI and non-ROI areas. The video quality metric takes into account a user's degree of preference, i.e., interest in the ROI, ROI video fidelity, and ROI perceptual quality in evaluating the quality of an encoded video sequence.

The weighted bit allocation may be applied within the rho ($\rho$)-domain and may rely on a $\rho$-domain frame budget provided by a frame-level rate controller. In general, the non-ROI skipping technique may be applied alone or in conjunction with the other techniques described herein to conserve encoding bits for allocation to the ROI while maintaining acceptable visual perceptual quality in both the ROI and non-ROI.

Figure 2:
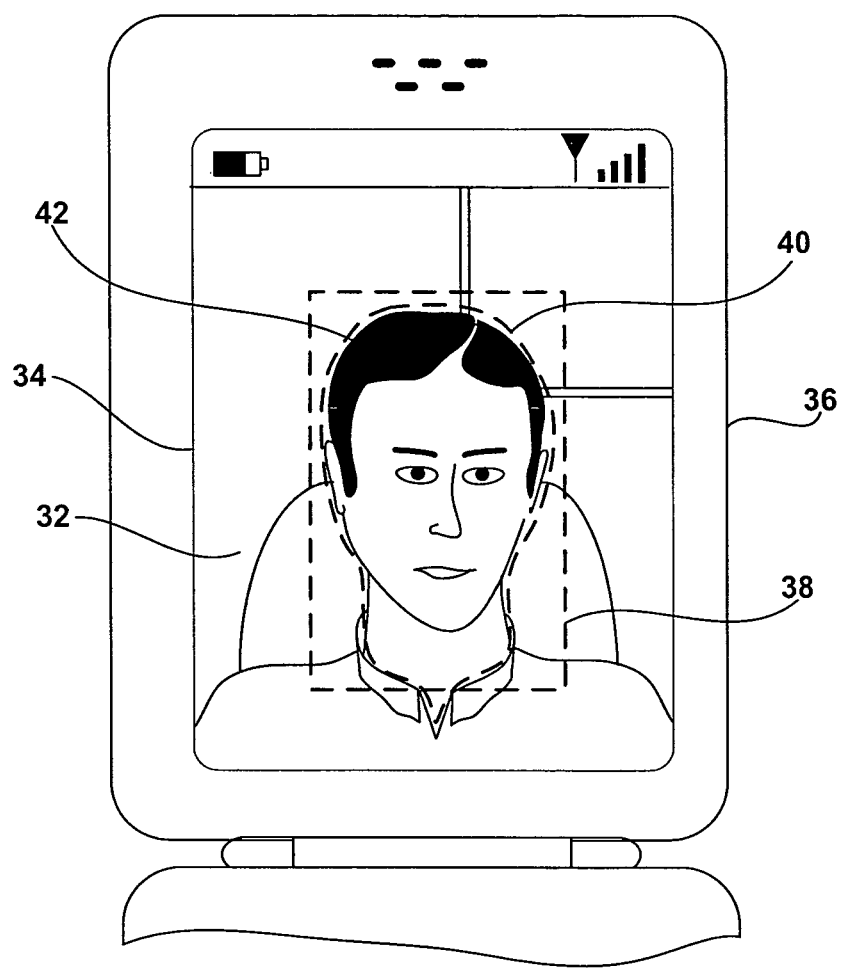
FIG. 2 is a diagram illustrating definition of an ROI within a video scene presented on a display associated with a wireless communication device.
Figure 3A:
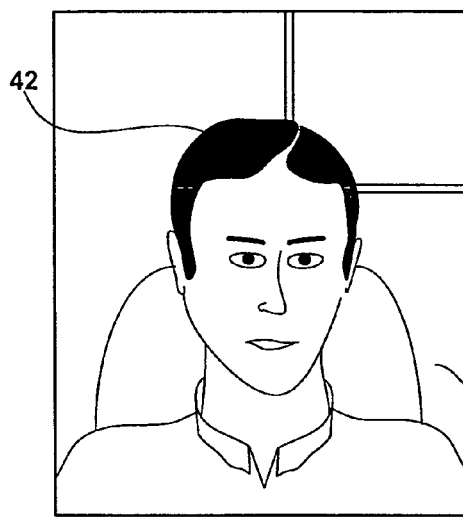
FIGS. 3A and 3B are diagrams illustrating ROI and non-ROI areas of the video scene depicted in FIG. 2.
Figure 3B:
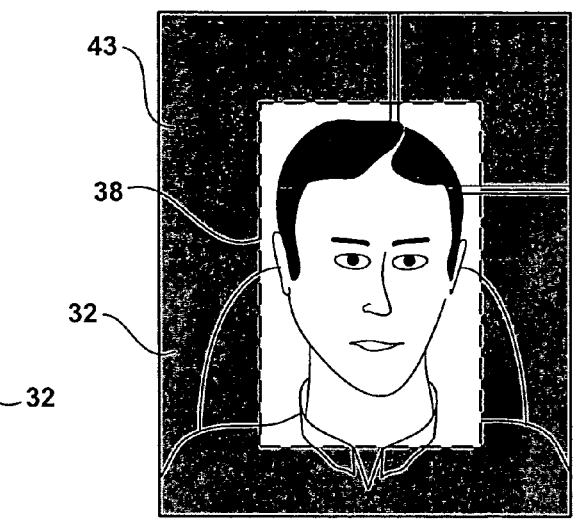

FIG. 2 is a diagram illustrating definition of an ROI within a video scene 32 presented on a display 34 associated with a wireless communication device 36. In the example of FIG. 2, the ROI is depicted as either a rectangular ROI 38 or a non-rectangular ROI 40. Non-rectangular ROI 40 may have a rounded or irregular shape. In each case, ROI 38 or ROI 40 contains the face 42 of a person presented in video scene 32. FIGS. 3A and 3B are diagrams illustrating ROI 38 and non-ROI area 43 of the video scene 32 depicted in FIG. 2. The non-ROI area 43, i.e., the background, is highlighted by shading in FIG. 3B.

ROI 38 or 40 may be defined manually by a user, automatically by device 36, or using a combination of manual ROI description by a user and automatic ROI definition by device 36. Rectangular ROI 38 may be selected by a user. Non-rectangular ROI 40 may be drawn by a user, e.g., using a stylus and a touchscreen, or selected automatically by device 36 using any of a variety of object detection or segmentation techniques. For VT applications, ROI 38 or 40 may encompass a portion of video scene 32 that contains the face 42 of a participant in a videoconference. The size, shape and position of ROI 38 or 40 may be fixed or adjustable, and may be defined, described or adjusted in a variety of ways.

ROI 38 or 40 permits a video sender to emphasize individual objects within a transmitted video scene 32, such as the face 42 of a person. Conversely, ROI 38 or 40 permits a video recipient to more clearly view desired objects within a received video scene 32. In either case, face 42 within ROI 38 or 40 is encoded with higher image quality relative to non-ROI areas such as background regions of video scene 32. In this way, the user is able to more clearly view facial expressions, lip movement, eye movement, and the like.

ROI 38 or 40 may be used, however, to specify objects other than the face. Generally speaking, the ROI in VT applications can be very subjective and may differ from user to user. The desired ROI also depends on how VT is used. In some cases, VT may be used to view and evaluate objects, in contrast to videoconferencing. For example, a user may wish to focus on a section of a whiteboard containing equations or drawings, rather than a presenter's face, particularly when the presenter is facing away from the camera and toward the whiteboard. In some cases, a video scene may include two or more ROI's, which are designated for preferential encoding.

Figure 4:
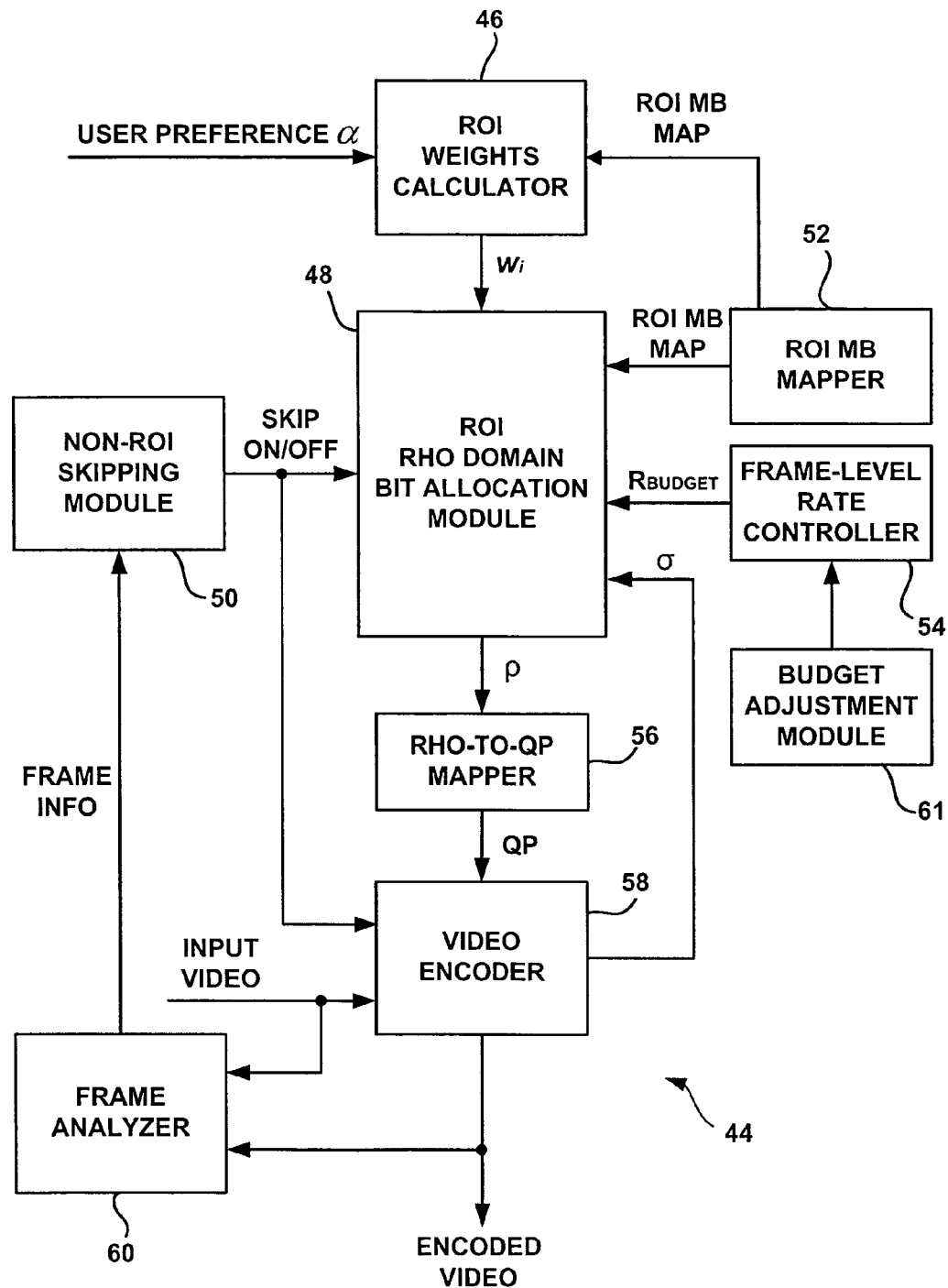
FIG. 4 is a block diagram illustrating a video communication device incorporating an ROI-enabled encoder with a content-adaptive non-ROI skipping module.

FIG. 4 is a block diagram illustrating an ROI-enabled video encoding system 44 for use in a video communication device 12. As shown in FIG. 4, system 44 includes ROI weights calculator 46, ROI $\rho$-domain bit allocation module 48, content-adaptive non-ROI skipping module 50, ROI macroblock (MB) mapper 52, frame-level rate controller 54, $\rho$-to-quantization parameter (QP) mapper 56, video encoder 58, frame analyzer 60, and budget adjustment module 61. As will be described, content-adaptive non-ROI skipping module 50 makes use of frame information provided by frame analyzer 60 to make a dynamic determination of whether to skip the non-ROI area of a frame under consideration. The frame information may include video content activity, such as ROI shape deformation, ROI motion, non-ROI motion, and non-ROI texture complexity, and accumulated distortion due to non-ROI skipping.

The various components depicted in FIG. 4 may be formed in a variety of ways, as discrete functional modules or as a monolithic module that encompasses the functionality ascribed to each module. In any event, the various components of video encoding system 44 may be realized in hardware, software, firmware, or a combination thereof. For example, such components may operate as software processes executing on one or more microprocessors or digital signal processors (DSPs), one or more application specific integrated circuits (ASICs), one or more field programmable gate arrays (FPGAs), or other equivalent integrated or discrete logic circuitry. In FIG. 4, MUX-DEMUX and audio components are omitted for ease of illustration.

In the example of FIG. 4, ROI weights calculator 46 may receive a user preference factor $\alpha$ entered by a local user of video communication device 12 or a remote user of video communication device 14. The user preference $\alpha$ is a perceptual importance factor for the ROI, which expresses the importance of visual quality of the ROI form the perspective of the actual user. User preference $\alpha$ quantifies the degree to which a user values visual quality within the ROI. If the user strongly values ROI visual quality, $\alpha$ will be high. If the visual quality of the ROI is less important, $\alpha$ will be lower. Based on preference $\alpha$, ROI weights calculator 46 generates a set of weights $w_i$ that are applied to ROI $\rho$-domain bit allocation module 48 to bias the weighted bit allocation between non-ROI and ROI areas of a video frame being encoded by video encoder 58. The weights $w_i$ may be designated for individual video blocks, such as macroblocks (MBs), within a video frame. ROI weights calculator 46 receives an ROI MB map from ROI MB mapper 52, and assigns respective weights $w_i$ to ROI and non-ROI MBs identified by ROI MB mapper 52. Macroblocks with higher weights $w_i$ will receive a higher number of coding bits.

The ρ-domain bit allocation module 48 receives the weights input $w_i$ from ROI weights calculator 46, a skipping indication (SKIP ON/OFF) from content-adaptive non-ROI skipping module 50, an ROI MB map from ROI MB mapper 52, a ρ-domain rate budget $R_{BUDGET}$ from frame-level rate controller 54, and a standard deviation σ for the encoded MBs from video encoder 58. The frame-level rate budget $R_{BUDGET}$ may be a ρ-domain budget for the frame under consideration, e.g., as described in Z. He and S. K. Mitra, "A linear source model and a unified rate control algorithm for DCT video coding", IEEE Trans. Circuits and System for Video Technology, Vol. 12, No. 11, November 2002. pp. 970-982. The standard deviation σ may be the standard deviation of the actual residue obtained after motion estimation, and can be the stored residue statistics from previous frames.

The ROI MB map provided by ROI MB mapper 52 identifies the MBs, within a given video frame, that fall within the specified ROI. Using the ROI MB map, the ρ-domain bit allocation module 48 distinguishes ROI MBs from non-ROI MBs for purposes of preferential bit allocation to the ROI MBs, i.e., using the weights $w_i$ provided by ROI weights calculator 46. Bit allocation module 48 generates a ρ parameter for each MB. The ρ parameter represents the number of non-zero AC coefficients in an MB. Rate control in the ρ domain, at the MB level and the frame level, tends to be more accurate than rate control in the QP domain.

For purposes of this disclosure, it is assumed that a suitable process for generation of the ROI MB map is available. For example, the ROI mapping process may be based on manual input from a user defining the ROI, or automatic definition or detection of the ROI, e.g., using conventional techniques such as face detection, face segmentation, and target tracking with acceptable accuracy. In this disclosure, for purposes of illustration, head or head-and-shoulder video sequences are considered, although the techniques described herein may be applicable to other types of video sequences containing a variety of objects in addition, or as an alternative, to persons.

Frame-level rate controller 54 generates an allocation of bits to individual frames within a video sequence. In particular, frame-level rate controller 54 generates a ρ-domain value $R_{BUDGET}$ that indicates the number of bits available for encoding all of the MBs within the present frame, i.e., both ROI and non-ROI MBs. As further shown in FIG. 4, ρ-domain bit allocation module 48 receives a skip indication (SKIP ON/OFF) from non-ROI background skipping module 50, which indicates whether the non-ROI area in the present frame will be encoded or skipped.

If the background will be skipped, then ρ-domain bit allocation module 48 can, in effect, recapture the bits that would otherwise have been allocated to the non-ROI, and reallocate them to the pool of bits available to encode the ROI of the current frame or future frames. Hence, if skipping is ON in a particular frame, ρ-domain bit allocation module 48 has more bits within $R_{BUDGET}$ to allocate to the ROI. Accordingly, budget adjustment module 61 may adjust the frame-level value $R_{BUDGET}$ in proportion to the number of coding bits recaptured by non-ROI skipping. If encoding of the non-ROI is skipped in a particular frame, the non-ROI area from a previously encoded frame may be substituted in its place. Alternatively, the skipped non-ROI area may be produced by interpolation.

Using the weights $w_i$, ROI MB map, $R_{BUDGET}$, SKIP ON/OFF indication, and standard deviation σ, ρ-domain bit allocation module 48 generates a ρ-domain output indicating the ρ budget for each MB. The ρ-domain output is applied to ρ-to-QP mapper 56, which maps the ρ value to a corresponding QP value for each MB. Using the QP values for the MBs within the frame, video encoder 58 encodes input video to produce encoded video. In addition, skipping module 50 may provide a skip indication (SKIP ON/OFF) to video encoder 58 to direct the video encoder to encode ROI areas of the frame, and skip encoding of the non-ROI area of a frame when skipping is ON. Skipping may be adaptive in the sense that skipping module 50 may direct video encoder 58 to skip encoding of the non-ROI areas for selected frames based on the frame information obtained by frame analyzer 60. In this manner, skipping module 50 may apply adaptive skipping on a dynamic basis in order to maintain visual quality.

The input video may be obtained from a video capture device, such as a video camera integrated with, or operably coupled to, video communication device 12. In some embodiments, for example, the video capture device may be integrated with a mobile telephone to form a so-called camera phone or video phone. In this manner, video capture device 40 may support mobile VT applications. The video may be presented both locally on video communication device 12 and, upon transmission, on video communication device 14 via a display device, such as a liquid crystal display (LCD), a plasma screen, or the like, which may be integrated with, or operably coupled to, video communication device 12 or 14.

ROI weights calculator 46 of FIG. 4 may form part of an ROI quality metric calculator. Accordingly, one product of such an ROI quality metric calculator may be a set of weights $w_i$, which may be based on user preference factor α, as well video fidelity, spatial quality, and/or temporal quality values. The ROI quality metric calculator receives user preference value α and one or more video distortion values. The video distortion values may be divided into ROI values and non-ROI values, and may include video fidelity values $D_{RF}$, $D_{NF}$, spatial quality values $D_{RS}$, $D_{NS}$, and temporal quality values $D_{RT}$, $D_{NT}$. $D_{RF}$ represents the video fidelity within the ROI, while $D_{NF}$ represents the video fidelity within the non-ROI region. $D_{RS}$ represents the spatial quality within the ROI area, while $D_{NS}$ represents the spatial quality within the non-ROI area. $D_{RT}$ represents temporal quality within the ROI area, while $D_{NT}$ represents temporal quality within the non-ROI area. The ROI quality metric jointly considers the users' interest, video fidelity and perceptual quality (spatial, temporal or both) in evaluating the quality of an encoded video sequence. In some embodiments, the metric may be used to bias the bit allocation algorithm applied by ρ-domain bit allocation module 48 to achieve better subjective visual quality.

Although ROI video coding has been widely studied, the quality measurement for ROI video has not been addressed in sufficient detail. Most quality measurement techniques use peak signal to noise ratio (PSNR) as a distortion measurement to evaluate the quality of ROI and non-ROI portions of a video frame. An ROI video quality metric is useful not only for analysis purposes, but as an input to bias weighted bit allocation techniques (e.g., as applied by bit allocation module 48 of FIG. 4) toward a subjective visual favorable solution. In general, as discussed above, the evaluation of an ROI video quality considers at least three aspects: users' ROI visual quality interest or preference α, video fidelity of the reconstructed video data, and perceptual quality (spatial, temporal or both) of the reconstructed video data.

The user's preference α directly determines the classification of a video frame into ROI and non-ROI parts and their associated perceptual importance factors. The preference may be specified by a user at the near-end or far-end. In video telephony applications, a speaker's face region is a typical ROI because the human being's facial expression is very complicated and small variation can convey a large quantity of information. For the video fidelity factor, PSNR is a good measurement, which indicates the total amount of distortion of the reconstructed video frame compared to the original frame. The reconstructed frame is produced by decoding the encoded video frame, whereas the original frame is the video frame prior to encoding.

In many cases, video fidelity will be the most important consideration for video coding, where any improvement might cause better subjective visual quality. However, this is not always the case, which is why perceptual quality factors should also be taken into account in some cases. The perceptual quality considers both spatial errors and temporal errors. Spatial errors may include the presence of blocking (i.e., blockiness), ringing artifacts, or both. Temporal errors may include the presence of temporal flicker, i.e., when the visual qualities of the video frame change non-uniformly along the temporal axis. Temporal errors can result in choppy motion in a video sequence, which is undesirable.

$D_R$ and $D_{NR}$ denote the normalized per pixel distortion of the ROI and non-ROI, and α the ROI perceptual importance factor. If it is assumed that the relationship among the aspects mentioned above can be simplified into a linear function in video quality evaluation, then the overall distortion of the video sequence can be represented as:

$$D_{sequence} = \alpha D_R + (1-\alpha)D_{NR} \quad (1)$$

$$= \frac{\alpha}{M} \begin{bmatrix} \beta \sum_{i=1}^{M} D_{RF}(f_i, \tilde{f}_i) + \\ \gamma \sum_{i=1}^{M} D_{RS}(\tilde{f}_i) + (1-\beta-\gamma) \\ D_{RT}(\tilde{f}_1, \ldots, \tilde{f}_M) \end{bmatrix} +$$

$$\frac{(1-\alpha)}{M} \begin{bmatrix} \beta \sum_{i=1}^{M} D_{NF}(f_i, \tilde{f}_i) + \\ \gamma \sum_{i=1}^{M} D_{NS}(\tilde{f}_i) + (1-\beta-\gamma) \\ D_{NT}(\tilde{f}_1, \ldots, \tilde{f}_M) \end{bmatrix},$$

where $f_i$ and $\tilde{f}_i$ are the ith original and reconstructed frames within the M frames in the video sequence, β and γ are weighting factors, $D_R$ and $D_{NR}$ are the total distortion for ROI and non-ROI, $D_{RF}$, $D_{RS}$ and $D_{RT}$ are the normalized errors of ROI in fidelity, spatial perceptual quality and temporal perceptual quality, and $D_{NF}$, $D_{NS}$ and $D_{NT}$ are their counterparts for the non-ROI area. The values α, β and γ should be assigned real values between 0 and 1. The resulting quality metric can be used as a cost function to formulate an optimization problem for the rho (ρ) parameter in weighted bit allocation, or used for other problems in ROI processing.

In low-bit rate video applications, such as wireless video telephony, blocking (i.e., blockiness) artifacts are a major concern of spatial perceptual quality. This kind of artifact is caused by quantization where most of the high-frequency coefficients are removed, i.e., set to zero. The resulting effect is that the smoothed image blocks make the block boundaries quite pronounced. At the extreme low bit-rate cases, only DC coefficients will be coded, which makes the decoded image piece-wise constant blocks. In this disclosure, the ROI spatial quality value $D_{RS}$ (similar for $D_{NS}$) is defined as the normalized blockiness distortion, which may be represented as:

$$D_{RS}(\tilde{f}) = \frac{\text{boundaries with discontinuities}}{\text{Number of boundaries}}, \quad (2)$$

where boundaries between blocks are checked to see if perceivable discontinuities exists. A suitable discontinuity detection approach, which checks the sum of the mean squared difference of intensity slope across the block boundaries, is described in S. Minami and A. Zakhor, "An optimization approach for removing blocking effects in transform coding", *IEEE Trans. Circuits Systems for Video Technology*, Vol. 5, No. 2, pp. 74-82, April 1995, the entire content of which is incorporated herein by reference. The assumption of this approach is that the slopes on both sides of a block boundary should be identical and an abrupt change in slope is probably due to quantization.

In equation (1), the $D_{RT}$ (or $D_{NT}$) value is defined as an assigned score in the range of [0, 1] based on the variance of $D_{RS}$ (or $D_{NS}$) for all the frames in the video sequence. In this manner, the terms on video fidelity, spatial perceptual quality, and temporal perceptual quality are normalized and can be bridged by weighting parameters α, β and γ to form a controllable video quality measurement. The selection of these weighting parameters is up to users based on their requirements and expectations. Again, this measurement may be helpful as an input to bias the bit allocation process toward favoring subjective perception. Consequently, the user may achieve a more visually pleasing result in ROI coding.

Bit allocation module 48 obtains both an ROI definition and rate budget for a frame. The ROI definition may take the form of an ROI MB map that identifies MBs or other video blocks that fall within the ROI. The rate budget provides the number of bits available for encoding the entire frame, including ROI and non-ROI areas. In addition, bit allocation module 48 obtains the ROI weights $w_i$ from ROI weights calculator 46, which biases bit allocation between the ROI and non-ROI. With the skip mode indication, bit allocation module 48 is able to determine whether all available bits can be devoted to the ROI (non-ROI frame skipping ON) or whether the bits must be shared between ROI and non-ROI (non-ROI frame skipping OFF).

Using the ROI definition, frame rate budget, weights $w_i$, and non-ROI skip mode, bit allocation module 48 generates a weighted ρ-domain allocation of bits between the ROI MBs and non-ROI MBs. Upon determination of the ρ-domain bit allocation, mapper 56 performs a ρ to QP mapping to provide MB QP values for application to video encoder 58. Mapper 56 may apply a ρ to QP mapping table, or an equation or function that generates a QP for a particular p. Video encoder 58 uses the QP values provided by the bit allocation module 48 and mapper 56 to encode individual ROI and non-ROI MBs within the applicable video frame. The resulting bit allocation may take into account not only the applicable frame budget, but also the availability of non-ROI skipping and a quality metric associated with a preceding frame or frames in the video sequence. The operation of bit allocation module 48 will be described in greater detail below.

The bit allocation technique described in this disclosure generally assumes the availability of sufficient ROI detection or definition, and the availability of acceptable frame-level rate control. On this basis, the bit allocation technique generally focuses on MB-level rate control between ROI and non-ROI MBs. Most conventional ROI bit allocation algorithms are based on a weighted version of the ITU H.263+ TMN8 model, where a cost function is created and the distortion components on various regions in the function are punished differently by using a set of preset weights. Like most of the other video standards, TMN8 uses a QP-domain rate control scheme, which models the rate and distortion with functions of QP. However, the bit allocation technique described in this disclosure makes use of a ρ-domain rate control module, where ρ represents the number of non-zero quantized AC coefficients in an MB in video coding. The use of ρ-domain bit allocation, as described herein, tends to be more accurate than QP domain rate control and may effectively reduce rate fluctuations.

In video coding applications, a typical problem is to minimize a distortion value $D_{sequence}$ with a given bit budget for the video sequence. The optimal solution for this complicated problem relies on an optimal frame-level rate control algorithm and an optimal macroblock-level bit allocation scheme. However, for real-time applications, such as video telephony, where very limited information about future frames is available when coding the current frame, it is not practical or feasible to pursue an optimal frame-level rate control. Typically, a popular rate control algorithm ("greedy" algorithm) is applied. The greedy algorithm assumes that the complexity of the video content is uniformly distributed along the frames in the video sequence. On this basis, the greedy algorithm allocates a fraction of the available bits to each of the frames in the sequence. In real-time applications, the limited availability of future frame information also makes it difficult to consider temporal quality in rate control.

In this disclosure, to find a practical solution and simplify the bit allocation problem, it is generally assumed that a good frame-level rate control is available. This assumption reduces the bit allocation problem to macroblock-level bit allocation. At the same time, the bit allocation scheme may take advantage of a non-ROI skipping approach. The non-ROI skipping increases the chance to reduce the value of the temporal distortion term $D_{NT}(\tilde{f}_1, \ldots \tilde{f}_M)$ because the skipped region will present the same perceptual quality as that of the previous frame. Thus, the skipping of the non-ROI area may reduce fluctuation of the perceptual quality between consecutive frames.

For purposes of illustration, the image quality of a video frame is evaluated according to equation (1). For simplicity, however, β and γ are set so that β+γ=1. Denoting $R_{budget}$ as the total bit budget for a given frame f and R the bit rate for coding the frame, the problem can be represented by the following function:

Minimize $\alpha[\beta D_{RF}(f,\tilde{f})+(1-\beta)D_{RS}(\tilde{f})]+(1-\alpha)[\beta D_{NF}(f,\tilde{f})+(1-\beta)D_{NS}(\tilde{f})]$, (3)

Such that $R \leq R_{budget}$.

The above optimization problem could be solved by Lagrangian relaxation and dynamic programming. However, the computational complexity of such an approach would be much higher than a real-time system could bear. Therefore, in accordance with this disclosure, a low-complexity near-optimal solution is preferred. In particular, in this disclosure, a two-stage bit allocation algorithm in the ρ domain is applied. The first stage involves the following optimization problem:

Minimize $\alpha D_{RF}(f,\tilde{f})+(1-\alpha)D_{NF}(f,\tilde{f})$, such that
$R \leq R_{budget}$. (4)

After the optimal coding parameters for equation (4) are obtained, the second stage adjusts the coding parameters iteratively to reduce the term $\alpha D_{RS}(\tilde{f})+(1-\alpha)D_{NS}(\tilde{f})$ until a local minimum is reached. The result of this two-stage algorithm may be very close to the optimal solution when β is a relatively large number. When β=1, problems (3) and (4) are identical. In this disclosure, the focus is on the first stage and a solution to problem (4).

In ROI video coding, N is the number of MBs in the frame, $\{\rho_i\}$, $\{\sigma_i\}$, $\{R_i\}$ and $\{D_i\}$ are the set of ρ's, standard deviation, rates and distortion (sum of squared error), respectively, for the ith macroblocks. Thus, $$R = \sum_{i=1}^{n} R_i.$$

A set of weights $\{w_i\}$ is defined for all MBs in the frame as:

$$w_i = \begin{cases} \dfrac{\alpha}{K} \\ \dfrac{1-\alpha}{(N-K)} \end{cases} \quad (5)$$

if the ith MB belongs to ROI
if the ith MB belongs to Non-ROI'
where K is the number of MBs within the ROI. Equation (5) may be implemented, e.g., by ROI weights calculator 46. Therefore, the weighted distortion of the frame is:

$$D = \sum_{i=1}^{N} w_i D_i = [\alpha D_{RF}(f,\tilde{f})+(1-\alpha)D_{NF}(f,\tilde{f})] * 255^2 * 384, \quad (6)$$

Hence the problem (4) can be rewritten as:

Minimize D, such that $R \leq R_{budget}$. (7)

Equation (7) is solved by using a modeling-based bit allocation approach. The distribution of the AC coefficients of a nature image can be best approximated by a Laplacian distribution $$p(x) = \frac{\eta}{2} e^{-\eta|x|}.$$

Therefore, the rate and distortion of the ith macroblock can be modeled in equations (8) and (9) below as functions of ρ.

For example, rate can be represented as:

$R_i = A\rho_i + B$, (8)

where A and B are constant modeling parameters, and A can be thought of as the average number of bits needed to encode non-zero coefficients and B can be thought of as the bits due to non-texture information.

In addition, distortion can be represented as:

$D_i = 384\sigma_i^2 e^{-\theta \rho_i/384}$ (9)

where θ is an unknown constant and σ is the standard deviation of the residual data. Here, the bit allocation technique optimizes $\rho_i$ instead of quantizers because it is assumed there is a sufficiently accurate $\rho$-QP table available to generate an acceptable quantizer from any selected $\rho_i$. In general, equation (7) can be solved by using Lagrangian relaxation in which the constrained problem is converted into an unconstrained problem as follows:

$$\underset{\rho_i}{\text{Minimize }} J_\lambda = \lambda R + D \quad (10)$$

$$= \sum_{i=1}^{N}(\lambda R_i + w_i D_i)$$

$$= \sum_{i=1}^{N}[\lambda(A\rho_i + B) + 384 w_i \sigma_i^2 e^{-\theta \rho_i/384}],$$

where $\lambda^*$ is the solution that enables $$\sum_{i=1}^{N} R_i = R_{budget}.$$

By setting partial derivatives to zero in equation (10), the following expression for the optimized $\rho_i$ is obtained:

$$\text{let } \frac{\partial J_\lambda}{\partial \rho_i} = \frac{\partial \sum_{i=1}^{N}[\lambda(A\rho_i + B) + 384 w_i \sigma_i^2 e^{-\theta \rho_i/384}]}{\partial \rho_i} = 0, \quad (11)$$

which is $$\lambda A - \theta w_i \sigma_i^2 e^{-\theta \rho_i/384} = 0, \quad (12)$$

$$\text{so } e^{-\theta \rho_i/384} = \frac{\lambda A}{\theta w_i \sigma_i^2}, \quad (13)$$

$$\text{and } \rho_i = \frac{384}{\theta}[\ln(\theta w_i \sigma_i^2) - \ln(\lambda A)]. \quad (14)$$

On the other hand, because:

$$R_{budget} = \sum_{i=1}^{N} R_i = \frac{384 A}{\theta} \sum_{i=1}^{N}[\ln(\theta w_i \sigma_i^2) - \ln(\lambda A)] + NB, \quad (15)$$

the following relationship holds, $$\ln(\lambda A) = \frac{1}{N}\sum_{i=1}^{N}\ln(\theta w_i \sigma_i^2) - \frac{\theta}{384 NA}(R_{budget} - NB). \quad (16)$$

From equations (14) and (16), bit allocation model I is obtained as follows:

$$\rho_i = \frac{384}{\theta}\left[\ln(\theta w_i \sigma_i^2) - \frac{1}{N}\sum_{i=1}^{N}\ln(\theta w_i \sigma_i^2) + \frac{\theta}{384 NA}(R_{budget} - NB)\right] \quad (17)$$

$$= \frac{R_{budget} - NB}{NA} + \frac{384}{\theta}\left[\ln(\theta w_i \sigma_i^2) - \frac{\sum_{i=1}^{N}\ln(\theta w_i \sigma_i^2)}{N}\right].$$

The resulting $\rho$ is then mapped to a corresponding QP, and used to allocate an appropriate number of coding bits to the respective ROI or non-ROI MB.

Another bit allocation model (bit allocation model II) may be obtained using an alternative distortion model. According to the alternative distortion model, assuming the availability of a uniform quantizer with step size q, the distortion caused by quantization is given by:

$$D(q) = 2\int_{0}^{0.5q} p(x) x\, dx + 2\sum_{i=1}^{\infty}\int_{(i-0.5)q}^{(i+0.5)q} p(x)|x - iq|\, dx \quad (18)$$

$$= \frac{1}{\eta}\left[1 + \frac{e^{-\eta q}}{1 - e^{-\eta q}}(2 - e^{-0.5\eta q} - e^{0.5\eta q}) - e^{-0.5\eta q}\right]$$

and the percentage of zeros is given by:

$$\psi = \int_{-0.5q}^{0.5q} \frac{\eta}{2} e^{-\eta|x|}\, dx = 1 - e^{-0.5\eta q}. \quad (19)$$

Thus, $$D(q) = \frac{\psi}{\eta(2 - \psi)}. \quad (20)$$

According to Shannon's source coding theorem, as described in T. M. Cover and J. A. Thomas, "*Elements of information theory*", Wiley, New York, N.Y., 1991, for a Laplacian source, the minimum number of bits needed to represent a symbol is given by:

$$R(q) = \log_2\left(\frac{1}{\eta D(q)}\right),$$

such that $$R_i = \sum^{384} R(q) = 384\log_2\left(\frac{1}{\eta D(q)}\right) = 384\log_2\frac{2 - \psi_i}{\psi_i}. \quad (21)$$

Since $$\psi_i = 1 - \frac{\rho_i}{384},$$

where 384 is the total number of coefficients in the ith macroblock for 4:2:0 video, equation (21) can be expanded by using Taylor expansion and the relationship between bit rate and $\rho$ can be approximated by:

$$R_i = A\rho_i + B, \quad (22)$$

where A and B are constant modeling parameters, and A can be thought of as the average number of bits needed to encode a non-zero coefficients and B can be thought of as the bits due to non-texture information.

In addition, the variance of the coefficients is represented by:

$$\sigma^2 = \int_{-\infty}^{+\infty} p(x)x^2 \, dx = \int_{-\infty}^{+\infty} \frac{\eta}{2} x^2 e^{-\eta|x|} \, dx = \frac{2}{\eta^2}, \qquad (23)$$

As a result, the distortion of the ith macroblock can be represented by:

$$D_i = \sum_{i=1}^{384} D(q) = \frac{384 \psi_i}{\eta(2-\psi_i)} = \frac{384 - \rho_i}{\sqrt{2}(384+\rho_i)} \sigma_i. \qquad (24)$$

As in the derivation of bit allocation model I, the optimal bit allocation scheme can be achieved by solving the optimization problem (7), i.e., the following problem:

$$\underset{\rho_i}{\text{Minimize}} \, D, \text{ such that } R \le R_{budget}. \qquad (25)$$

In general, equation (25) can be solved by using Lagrangian relaxation in which the constrained problem is converted into an unconstrained problem as follows:

$$J_\lambda = \lambda R + D \qquad (26)$$

$$= \sum_{i=1}^{N} (\lambda R_i + D_i)$$

$$= \sum_{i=1}^{N} \left[ \lambda(A\rho_i + B) + \frac{(384-\rho_i)}{\sqrt{2}(384+\rho_i)} \sigma_i \right],$$

where $\lambda^*$ is the solution that enables $$\sum_{i=1}^{N} R_i = R_{budget}.$$

By setting partial derivatives to zero in (26), the following expression for the optimized $\rho_i$, is obtained:

$$\text{let} \frac{\partial J_\lambda}{\partial \rho_i} = \frac{\partial \sum_{i=1}^{N}\left[\lambda(A\rho_i+B)+\frac{(384-\rho_i)}{\sqrt{2}(384+\rho_i)}\sigma_i\right]}{\partial \rho_i} = 0, \qquad (27)$$

which is:

$$\lambda A - \frac{384\sqrt{2}}{(384+\rho_i)^2}\sigma_i = 0, \qquad (28)$$

$$\rho_i = \sqrt{\frac{384\sqrt{2}}{A\lambda}\sigma_i} - 384. \qquad (29)$$

On the other hand, because:

$$R_{budget} = \sum_{i=1}^{N} R_i = A \sum_{i=1}^{N} \sqrt{\frac{384\sqrt{2}}{A\lambda}\sigma_i} - 384NA + NB, \qquad (30)$$

then $$\sqrt{\frac{384\sqrt{2}}{A\lambda}} = \frac{R_{budget} + 384NA - NB}{A\sum_{i=1}^{N}\sqrt{\sigma_i}}. \qquad (31)$$

From equations (28) and (30), the following expression is obtained:

$$\rho_i = \frac{\sqrt{\sigma_i}}{\sum_{j=1}^{N}\sqrt{\sigma_j}} \left( \frac{R_{budget}}{A} - N\frac{B}{A} \right) + 384 \frac{\sqrt{\sigma_i} - \frac{1}{N}\sum_{j=1}^{N}\sqrt{\sigma_j}}{\frac{1}{N}\sum_{j=1}^{N}\sqrt{\sigma_j}}, \qquad (32)$$

$$= \frac{\sqrt{\sigma_i}}{\sum_{j=1}^{N}\sqrt{\sigma_j}} \rho_{budget} + 384 \frac{\sqrt{\sigma_i} - \frac{1}{N}\sum_{j=1}^{N}\sqrt{\sigma_j}}{\frac{1}{N}\sum_{j=1}^{N}\sqrt{\sigma_j}},$$

where $\rho_{budget}$ is the total $\rho$ budget for the frame.

Although the distortion is modeled differently in equation (32), based on that model, the following bit allocation model II is obtained:

$$\rho_i = \frac{\sqrt{w_i \sigma_i}}{\sum_{j=1}^{N}\sqrt{w_i \sigma_j}} \rho_{budget}. \qquad (33)$$

Equation (33) may be implemented, e.g., by bit allocation module 48.

The ability to skip encoding of non-ROI areas of a video frame can result in significant savings in bit allocation. If a non-ROI area is not encoded, i.e., skipped, the bits otherwise allocated to the non-ROI can instead be reallocated for encoding the ROI of the current frame or a future frame or frames to improve visual quality of MBs in the ROI. If the non-ROI is skipped for a given frame, the non-ROI encoded for a preceding frame is repeated or substituted by an interpolated non-ROI area in the current frame. In addition to conserving bits for ROI encoding, the skipping of the non-ROI area may improve the temporal quality of the current frame. In particular, presenting the same non-ROI area in two or more consecutive frames will tend to reduce temporal flicker in the non-ROI areas.

At very low bit rate, e.g., at 32 kbps, the non-ROI regions are normally coarsely coded even if the bits are uniformly distributed among MBs, where temporal visual quality issues such as flickering become prominent. On the other hand, in most cases of video telephony applications where background are non-ROI, there are very limited movements in the background. Therefore, background skipping is a solution for reallocating bits to improve the quality of ROI and coded non-ROI regions as long as the skipping does not severely degrade the video fidelity.

Frame skipping is a popular approach used in very low-bit rate applications to conserve coding bits. The difference between non-ROI skipping and frame skipping is that the ROI for each frame is coded in the non-ROI skipping approach to ensure good visual quality of the ROI. Frame skipping is very helpful in many applications. In ROI video coding, however, frame skipping would risk the loss of important information such as facial expressions, especially when α is set at a large value in equation (1), as any distortion of ROI would be heavily punished and could degrade the overall performance. Therefore, non-ROI skipping is a better choice and can generally save a significant number of bits to improve ROI quality because the number of background MBs is dominant in normal video frames.

The disclosure contemplates a content-adaptive non-ROI skipping technique. In addition, the disclosure contemplates an alternative, "unit-based" non-ROI skipping technique, which will be described in detail for purposes of comparison with the content-adaptive non-ROI skipping technique. The unit-based non-ROI skipping technique involves a grouping of successive frames into a unit that includes the ROI areas for the frames and a common non-ROI area shared among the frames. In particular, two consecutive frames are grouped. When configured to apply the unit-based non-ROI skipping technique, non-ROI background skipping module 50 groups frames i and i+1 into a frame unit, and notifies video encoder 58 of the frame in which the non-ROI area will be skipped. In response, video encoder 58 encodes the respective ROI areas of frames i and i+1 using the weighted bit allocation provided by bit allocation module 48. In addition, video encoder 58 encodes the non-ROI area of frame i using the weighted bit allocation. However, video encoder 58 does not encode the non-ROI area of frame i+1. Instead, the non-ROI area of frame i+1 is skipped, and the non-ROI area of the preceding frame i is provided in its place. Other techniques might also be used to define a skipped non-ROI, such as interpolation between the non-ROI of a previous and subsequent frame.

The unit-based non-ROI skipping technique may be provided on a full-time basis. For example, every two frames may be grouped into a unit for purposes of continuous, full-time skipping of the non-ROI on an alternating frame basis. In other words, the non-ROI in every second frame may be skipped on a full-time basis. As an alternative, unit-based skipping may be activated and deactivated on an adaptive basis. Skipping may be deactivated when non-ROI distortion produced by a recent, previous frame exceeds a distortion threshold. For example, if distortion in the non-ROI area of a previous frame is less than the threshold, the non-ROI for frame i+1 is skipped, and the process continues to the next group of two successive frames, as represented by the frame increment i=i+2. In this case, the level of non-ROI distortion is acceptable, and skipping is activated. If non-ROI distortion is greater than the distortion threshold, however, the non-ROI area of frame i+1 is encoded using weighted bit allocation. In this case, skipping is deactivated due to excessive non-ROI distortion, i.e., excessive distortion within the non-ROI area of the pertinent video scene.

As an illustration of unit-based non-ROI skipping, frames 0, 1, 2 and 3 represent successive frames within a video sequence. In this example, frame 0 and frame 1 are grouped into unit 1, and frame 2 and frame 3 are grouped into unit 2. Each unit shares a common non-ROI area. In particular, in the case of either full-time skipping or adaptive skipping with acceptable distortion, the non-ROI area of frame 0 is repeated for frame 1. Because the non-ROI area of frame 0 is repeated for frame 1, it is not necessary to encode the non-ROI area of frame 1. The grouping of frames into units may be applied throughout a video sequence. For example, two frames are grouped into a unit. In some applications, however, two or more frames may be grouped into a unit, with the non-ROI being skipped in all but one of the frames in the unit.

Upon grouping successive frames 0 and 1 into a unit, the ROI areas in frames 0 and 1, respectively, are encoded. However, the frame 0 non-ROI area is repeated for both frame 0 and frame 1, such that the non-ROI area for frame 1 is skipped. In this manner, the bit consumption otherwise required for encoding the frame 1 non-ROI are can be avoided. In this example, it should be noted that the non-ROI area, although referred to as "background," may include foreground features such as a person's shoulders. Accordingly, background is generally used in this disclosure to refer to any area outside the ROI, and should not be considered as strictly limited to background imagery within a video scene. The non-ROI skipping is described in further detail below.

An exemplary prototype system for implementation of the unit-based non-ROI skipping technique will now be described. In the prototype system, every two frames are grouped into a unit as described above. In each unit, the first non-ROI area is coded while the second non-ROI area is skipped, e.g., using predicted MBs with zero motion vectors. The bit allocation for each unit may be based on the same logic as the "greedy" frame-level bit allocation, with the assumption that the content complexity of the video frames in a sequence is uniformly distributed across the frames. With this assumption, the bits should be allocated uniformly among two-frame units as:

$$\rho_{unit\ i} = \frac{\rho_{Sequence} - \rho_{used}}{\frac{M}{2} - i}, \tag{34}$$

where $\rho_{sequence}$ is the total ρ-budget for a group of M consecutive frames in the video sequence, $\rho_{unit\ i}$ is the ρ allocation for the ith unit, and $\rho_{used}$ is the ρ consumption of the first (i−1)/2 units. Within a unit, either bit allocation model (I or II) may be used to allocate bits to MBs within the ROI and non-ROI areas.

The distortion produced by weighted bit allocation with and without unit-based non-ROI skipping can be explicitly compared, as indicated below:

$$D_{Skip\_on} = \alpha D_{RF}(\rho_1) + (1-\alpha)D_{NF}(\rho_2) + \alpha D_{RF}(\rho_{unit} - \rho_1 - \rho_2) + (1-\alpha)D_{NonROI\_skip}, \tag{35}$$

$$D_{Skip\_off} = \alpha D_{RF}(\rho_1') + (1-\alpha)D_{NF}(\rho_2') + \alpha D_{RF}(\rho_3') + (1-\alpha)D_{NF}(\rho_{unit} - \rho_1' - \rho_2' - \rho_3'), \tag{36}$$

where $D_{Skip\_on}$ is the unit total distortion when the non-ROI skipping mode is on, $D_{Skip\_off}$ is the unit total distortion when the background skipping mode is off, $D_{NonROI\_skip}$ is the distortion caused by skipping the non-ROI in the second frame of the unit, and where $\rho_1$ and $\rho_2$ in equation (35) and $\rho_1'$, $\rho_2'$ and $\rho_3'$ in equation (36) are the number of AC coefficients ($\rho$) allocated to the ROIs and non-ROI.

It can be observed from equations (35) and (36) that $D_{Skip\_on} > D_{Skip\_off}$ holds only if $D_{NonROI\_skip} >> D_{NF}(\rho_{unit} - \rho_1' - \rho_2' - \rho_3')$ because generally the following expression holds:

$$\alpha D_{RF}(\rho_1) + (1-\alpha)D_{NF}(\rho_2) + \alpha D_{RF}(\rho_{unit} - \rho_1 - \rho_2) < \alpha D_{RF}(\rho_1') + (1-\alpha)D_{NF}(\rho_2') + \alpha D_{RF}(\rho_3')$$

Based on the observation above, the task of pursuing a criterion for turning the unit-based non-ROI skipping mode on and off is converted into a task of looking for a threshold for the distortion of $D_{NonROI\_skip}$. If it is assumed that the unit distortion in a video sequence varies in a smooth fashion, which is generally true, then the average value of the most recently processed unit distortion can be used for deriving the distortion threshold. Denoting $\overline{D}_n$ as the mean distortion of the most recent n units, then based on (35) and (36) it is very possible to make $D_{Skip\_on} > D_{Skip\_off}$ if $(1-\alpha)D_{NonROI\_skip}$ $$> \frac{\overline{D}_n}{2}$$

holds. In other words, the criterion for switching off unit-based non-ROI skipping can be specified as $$D_{NonROI\_skip} > \frac{\overline{D}_n}{2(1-\alpha)}.$$

This criterion can serve as the basis for an adaptive non-ROI skipping algorithm.

The adaptive unit-based non-ROI skipping algorithm may be further described as follows.

Step 0: Initialize the data, and set $\overline{D}_n = 0$, and skipping mode=ON.

Step 1: Allocate $\rho$ budget for the current unit (group of two successive frames $F_n$ and $F_{n+1}$) using equation (33).

Step 2: Within the current unit, allocate bits for each macroblock by equation (33). If the skipping mode is ON, then no bits are assigned for the non-ROI for the second frame within the unit.

Step 3: After the distortion for the current unit is obtained, update $\overline{D}_n$ by $\overline{D} = (1-\eta)\overline{D}_{n-1} + \eta D_n$, where $\eta$ is a learning factor and is in a range of [0, 1].

Step 4: Get data for the next unit; if this is the last unit, go to step 6.

Step 5: Calculate the distortion of $D_{NonROI\_skip}$ for the new unit (group of next two frames $F_n+2$ and $F_n+3$);

$$\text{if } D_{NonROI\_skip} > \frac{\overline{D}_n}{2(1-\alpha)}$$

then turn the skipping mode OFF; otherwise, turn the skipping mode ON. Return to step 1.

Step 6: Terminate the adaptive unit-based skipping algorithm.

Again, the adaptive unit-based non-ROI skipping algorithm provides a point of comparison for the content-adaptive non-ROI skipping techniques described herein. The content-adaptive non-ROI skipping technique will be described in greater detail below. The content-based non-ROI skipping technique may be applied in a frame-by-frame processing sequence in conjunction with a $\rho$-domain frame-level rate control algorithm. The parameter $\rho$ represents the number of non-zero quantized AC coefficients in a macroblock in video coding. The content-adaptive non-ROI skipping technique may also be applied in conjunction with a weighted macroblock-level bit allocation algorithm as described herein.

When a frame is fetched, frame-level rate controller 54 (FIG. 4) assigns a target $\rho$ budget for the frame using a greedy frame-level rate control algorithm based on the remaining bits and the number of frames in the rate control window. The greedy model is based on the assumption that the content complexity of the video frames in the rate control window is uniformly distributed and thus the bits should be allocated uniformly among the remaining frames. After the target $\rho$ budget is established for the frame, ROI MB mapper 52 detects or tracks the ROI of the frame and classifies the MBs in the frame into ROI macroblocks and non-ROI macroblocks.

Video encoder 58 conducts motion estimation for all MBs in the current frame. The obtained motion information can be used as a part of the content cues in the content-adaptive non-ROI skip mode decision. Once the non-ROI skip mode decision is made, budget adjustment module 61 adjusts the $\rho$-domain budget $R_{BUDGET}$ for the current frame. Bit allocation module 48 then renders the MB-level bit allocation for preferential ROI coding using the adjusted budget. DCT transformation, quantization and entropy coding may then be conducted.

For unit-based non-ROI skipping, the mode of non-ROI skipping is determined by the accumulated distortion due to the skipped non-ROI area. In contrast, for content-adaptive non-ROI skipping, content information such as background activity and foreground activity are taken into account. For content-adaptive non-ROI skipping, two filters $F(\{x_n\}, M, Th)$ and $G(\{x_n\}, M, Th)$ are defined, where $\{x_n\}$ is a set of real numbers in which $x_n$ is the nth item, M an integer number, Th is a threshold in the range of [0, 1], and $$F(\{x_n\}, M, Th) = \begin{cases} 1 & x_n \text{ is greater than } Th*100\% \text{ of items in } x_{n-M}, \ldots, x_{n-1} \\ 0 & \text{otherwise} \end{cases} \quad (37)$$

and $$G(\{x_n\}, M, Th) = \begin{cases} 1 & \text{if } \frac{x_n - x_{n-M}}{x_{n-M}} \geq Th \\ 0 & \text{otherwise} \end{cases}. \quad (38)$$

Filter (37) detects within a local window (fixed length of M) if the current value $x_n$ is in the top position (above more than Th*100% of items). Filter (38) detects if there is an increase from $x_{n-M}$ to $x_n$ by more than Th*100%. Content-adaptive non-ROI skipping module 50 is configured to apply filters (37) and (38) to detect video content status or status change, which indirectly affects the skip mode decision.

The value of summed and averaged motion vectors in the frame (or recent frames) can be used to represent frame motion. When motion is higher, skipping of non-ROI encoding should be activated less frequently in order to protect possible content transition information. In ROI video coding, both ROI and non-ROI (background) activity may be considered. When a large amount of activity occurs in a non-ROI area, the frequency of non-ROI skipping should be reduced, as mentioned above. On the other hand, when the ROI contains a large amount of activity, the skipping of the non-ROI area may be helpful in reallocating more bits to code the ROI.

The term "activity" generally refers to local activity such as motion, as well as global activity such as shape. An example of motion activity is a changing facial expression from frame to frame, which results in relative movement of facial elements such as eyes and lips. An example of shape activity is the tilting of a person's head or another object from frame to frame, which results in shape changes. The relevant activity to be considered may occur, for example, within the ROI as shape deformation or motion, or in the non-ROI as motion of texture complexity. Accumulated distortion due to non-ROI skipping also may be considered in a non-ROI skipping decision.

If the value $\{\chi_n\}$ is denoted as the amount of non-ROI activity, and $\{\zeta_n\}$ is denoted as the amount of ROI activity for the frame sequences, then $$\chi_n = \sum_{i \in Non-ROI} (|MVx_i| + |MVy_i|), \qquad (39)$$

where $MVx_i$ and $MVy_i$ are x and y components of the motion vector of the ith macroblock in the nth frame, and:

$$\zeta_n = \mu_n \times \kappa_n, \qquad (40)$$

where $\{\mu_n\}$ is the ROI shape deformation factor and $\{\kappa_n\}$ is the ROI local movement factor, and:

$$\mu_n = \frac{\text{Number of pixels in nonoverlaped regions of ROIs of the}(n-1)th \text{ and } nth \text{ frames}}{\text{Number of pixels in ROI of the } nth \text{ frame}}, \qquad (41)$$

and:

$$\kappa_n = \sum_{i \in ROI} (|MVx_i| + |MVy_i|). \qquad (42)$$

The value $\{\zeta_n\}$ can characterize the degree of the ROI activities because $\{\mu_n\}$ represents the degree of global activities such as object movement/rotation and shape deformation, and $\{\kappa_n\}$ represents local activities such as change of facial expression.

Figure 5:
FIG. 5 illustrates changes in object movement/rotation and shape deformation for an object presented within an ROI of a video scene.
Figure 6:
FIG. 6 illustrates changes in facial expression for a person within an ROI of a video scene.

FIG. 5 illustrates changes in object movement/rotation and shape deformation for an object presented within an ROI of a video scene. In particular, the head of the person pictured in Frames 0 and 1 of FIG. 5 changes its position significantly. FIG. 6 illustrates changes in facial expression for a person within an ROI of a video scene. In particular, the mouth of the person pictured in Frames 0 and 1 transitions from a substantially closed position to a wide open position. Hence, FIGS. 5 and 6 represent cases of large activity in the ROI of a video scene.

The value $\{\sigma_{B_n}^2\}$ represents the total energy of the non-ROI residue per frame for the frame sequence. This value is also the distortion due to the skipped non-ROI. It is possible to represent the skip mode decision as:

$$S_n = F(\{\zeta_n\}, M_2, Th_{\zeta 1})G(\{\zeta_n\}, 1, Th_{\zeta 2}) + [1 - F(\{\zeta_n\}, M_2, Th_{\zeta 1})G(\{\zeta_n\}, 1, Th_{\zeta 2})] \qquad (43)$$

$$[1 - G(\{\sigma_{B_n}^2\}, p, Th_\sigma)][1 - F(\{\chi_n\}, M_1, Th_{\chi 1})][1 - G(\{\chi_n\}, 1, Th_{\chi 2})],$$

where $Th_\sigma$, $M_1$, $Th_{\chi 1}$, $Th_{\chi 2}$, $M_2$ and $Th_{\zeta 1}$ are thresholds and local window sizes defined by users, and p−1 the number of consecutive preceding frames of the current frame skipped background. In other words, the (n−p)th frame coded the non-ROI area, but the (n−p+1)th, (n−p+2)th, ... and (n−1)th frames skipped encoding of the non-ROI area. When the value $S_n=1$, coding of the non-ROI area of the current frame is skipped; otherwise, the non-ROI area is coded. From equation (43), it is observed that non-ROI skipping module 50 chooses to skip background when there is a sharp increase in the amount of ROI activity or the ROI contains a large amount of activity. Otherwise, if the non-ROI contains a large amount of motion or the accumulated distortion due to skipped non-ROI areas in other frames is rather high, then the non-ROI area will be coded.

Figure 7:
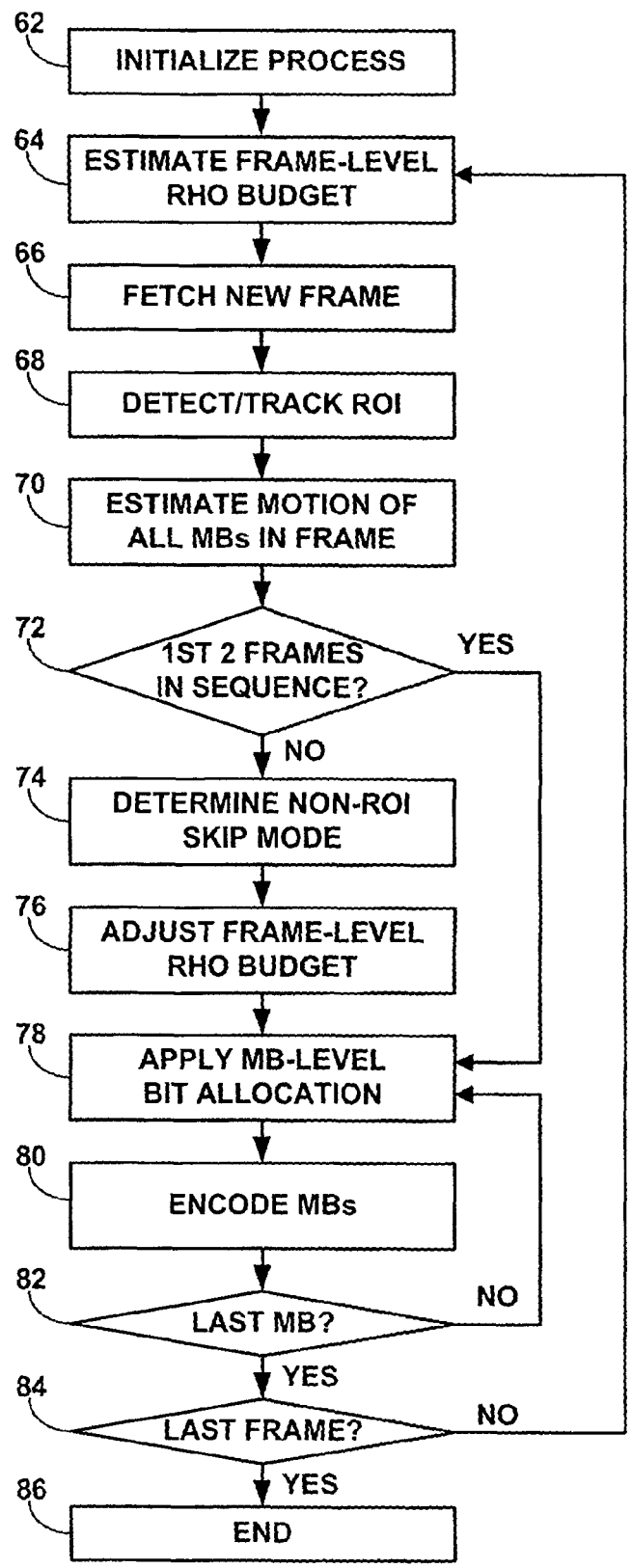
FIG. 7 is a flow diagram illustrating a technique for content-adaptive non-ROI skipping.

FIG. 7 is a flow diagram illustrating a technique for content-adaptive non-ROI skipping. As shown in FIG. 7, upon initialization of the non-ROI skipping process (62), frame-level rate controller 54 estimates a frame-level ρ budget (64). Upon fetching the next frame (66), ROI MB mapper 52 detects or tracks the ROI specified for the frame (68). Video encoder 58 then estimates motion for all MBs in the frame (70). If the fetched frame is one of the first two frames in the sequence (72), bit allocation module 48 applies an MB-level bit allocation (78). Otherwise, if the fetched frame is not one of the first two frames (72), non-ROI skipping module 50 determines the skip mode for the non-ROI of the frame (74). Budget adjustment module 61 then adjusts the frame-level ρ budget based on the skip mode (76) determined by non-ROI skipping module 50.

If the non-ROI is skipped, the frame-level ρ budget can be adjusted so that additional coding bits are made available to the ROI within the frame or successive frames. Upon adjustment of the frame-level ρ budget (76), bit allocation module 48 applies the MB-level bit allocation for preferential encoding of the ROI of the frame (78). Then, video encoder 58 encodes the MBs within the frame using the bit allocation (80). If the last MB in the frame is has not been reached (82), the process repeats as indicated by the NO branch of block 82. If the last MB has been reached (82), but the last frame in the video sequence or frame-level rate control window has not been reached (84), a new frame-level ρ budget is estimated (64) and the next frame is fetched (66). If the last MB (82) of the last frame (84) has been reached, the process ends (86).

In the example of FIG. 7, the frame-level ρ budget estimation (64) may be based on an assumption that the whole frame is coded. However, because some non-ROI areas in the sequence of video frames will be skipped, adjustment of the frame-level ρ-domain budget (76) is necessary. In this disclosure, three different strategies for frame-level ρ budget adjustment are considered: (1) "greedy" strategy, (2) "banker" strategy, and (3) "investor" strategy.

The "greedy" frame-level rate control strategy simply reduces the frame-level p budget based on the texture complexity of the ROI and Non-ROI areas within the frame when the non-ROI skip mode is ON, and does nothing if the non-ROI skip mode is OFF, i.e., if the non-ROI area for the frame is coded.

The "banker" frame-level rate control strategy reduces the ρ budget when the non-ROI skip mode is ON, but stores these saved ρ's for future frames. If the non-ROI area of a frame is coded, the frame will obtain all the ρ's saved from the previous frames in which the non-ROI areas were skipped.

The "investor" strategy estimates future skipping events based on statistics and patterns of the previous non-ROI skipping history over previous frames within a video sequence, and then determines the ρ budget based on the estimation. Hence, the budget is based on historical and predictive skipping statistics for the current frame and other frames.

Each of the frame-level rate control strategies may be chosen for implementation within budget adjustment module 61 to adjust the ρ-domain value $R_{BUDGET}$ generated by frame-level rate controller 54. Bit allocation module 48 uses the adjusted $R_{BUDGET}$ value to allocate coding bits between the ROI and the non-ROI area (if skipping is OFF for the pertinent frame).

The value $\{\rho_n^{budget}\}$ represents the ρ budget obtained from the frame-level rate controller, $\{\rho_n^{adjusted}\}$ represents the adjusted ρ budget, and n represents the index of current frame. Additional details of the greedy, banker and investor strategies are described below:

1. Greedy strategy. The $\rho_n^{adjusted}$ using this strategy can be calculated by:

$$\rho_n^{adjusted} = \begin{cases} \rho_n^{budget} & \text{if } S_n = 0 \\ \dfrac{\sum_{i \in ROI} \sqrt{w_i \sigma_i}}{\sum_{i \in ROI} \sqrt{w_i \sigma_i} + \sum_{i \in NON-ROI} \sqrt{w_i \sigma_i}} \rho_n^{budget} & \text{otherwise} \end{cases}, \quad (44)$$

where $\sigma_i$ represents the standard deviation of the DCT coefficients of the ith macroblock in the current frame, and $w_i$ is the associated weight for the macroblock in the macroblock-level weighted bit allocation performed by bit allocation module 48.

Equation (44) is an extension of equation (33). In equation (33), an ROI perceptual importance factor α is defined to bridge the distortion of ROI and non-ROI areas to form a weighted distortion measurement for the frame. Therefore, the perceptual peak signal to noise ratio (PSNR) is defined as:

$$\text{Perceptual PSNR} = -10 \log_{10}[\alpha D_R(f, \tilde{f}) + (1-\alpha) D_{NR}(f, \tilde{f})], \quad (45)$$

where f and $\tilde{f}$ are the original and reconstructed frames, and $D_R$ and $D_{NR}$ are the normalized per-pixel distortion of the ROI and non-ROI areas. As previously described in equation (5) above, the weight $w_i$ in accordance with the ρ-domain bit allocation technique is defined as:

$$w_i = \begin{cases} \dfrac{\alpha}{K} & \text{if it belongs to } ROI \\ \dfrac{1-\alpha}{(N-K)} & \text{if it belongs to Non-}ROI \end{cases} \quad (i = 1, 2, \ldots N),$$

where K is the number of macroblocks within the ROI and N the number of macroblocks in the frame.

2. Banker strategy. This strategy is a conservative approach similar to the traditional banking operation, where the customer can cash out the maximum of the total deposit of his account. In this case, the saving of ρ's in frames with non-ROI skipping is like a deposit of the resource for the benefit of the nearest future frame which codes its non-ROI area. In this case, the calculation for the adjusted ρ budget $R_{BUDGET}$ can be obtained by:

$$\rho_n^{adjusted} = \begin{cases} p\rho_{n-p+1}^{budget} - \sum_{i=1}^{p-1} \rho_{n-i}^{adjusted} & \text{if } S_n = 0 \\ \dfrac{\sum_{i \in ROI} \sqrt{w_i \sigma_i}}{\sum_{i \in ROI} \sqrt{w_i \sigma_i} + \sum_{i \in NON-ROI} \sqrt{w_i \sigma_i}} \rho_n^{budget} & \text{otherwise} \end{cases}, \quad (46)$$

where p−1 is the number of consecutive preceding frames of the current frame that skipped the non-ROI area while the (n−p)th frame codes its non-ROI area.

3. Investor strategy. The investor strategy is a more aggressive approach in which future possible skipping events are predicted and resources are allocated based on the prediction. In this case, it is assumed that the future frames in which non-ROI skipping is ON have similar complexity in the ROI as the current frame. Therefore, once it is estimated that there will be q frames with skipped non-ROI areas following the current frame, the adjusted ρ budget can be calculated by:

$$\rho_n^{adjusted} = \quad (47)$$

$$\begin{cases} \dfrac{p\rho_{n-p+1}^{budget} - \sum_{i=1}^{p-1} \rho_{n-i}^{adjusted}}{2\left(\sum_{i \in ROI} \sqrt{w_i \sigma_i} + \dfrac{1}{q+1}\sum_{i \in NON-ROI} \sqrt{w_i \sigma_i}\right)} \rho_n^{budget} + \\ \dfrac{p\rho_{n-p+1}^{budget} - \sum_{i=1}^{p-1} \rho_{n-i}^{adjusted}}{2} \\ \dfrac{\sum_{i \in ROI} \sqrt{w_i \sigma_i}}{\sum_{i \in ROI} \sqrt{w_i \sigma_i} + \sum_{i \in NON-ROI} \sqrt{w_i \sigma_i}} \rho_n^{budget} \end{cases}$$

if $S_n=0$ and n≤50
if $S_n=0$ and n>50
otherwise

In equation (47), the investor strategy acts exactly the same as the banker strategy for a series of initial frames, e.g., the first fifty frames in a video sequence. In this period, the statistics are collected for future q estimation. When n>50 and $S_n=0$, ρ is assigned an average value considering the previous saving ρ's and the predicted future saving due to non-ROI skipping.

The q value may be determined by a variety of predictive techniques. As an example, a Bayesian model can be used to convert the q value prediction problem into a multi-class classification problem. In this case, the classes are represented by all possibilities of q, e.g., classes 0, 1, 2, 3, 4, 5 if q is limited to be less than 6. The feature vector used in making the classification decision is $x_n = (\chi_n, \zeta_n, \sigma_{B_n}^2)$. As mentioned previously, the value $\{\sigma_{B_n}^2\}$ represents the total energy of the non-ROI residue per frame for the frame sequence. The Bayesian model learns from the statistics obtained from the initial frames, and takes advantage of the skip/no skip decision to make a better ρ allocation for subsequent frames. By defining thresholds for $\chi_n$, $\zeta_n$ and $\sigma_{B_n}^2$, the space of $\{x_n\}$ can be mapped into eight classes $\{y_n\}$ ($y_n = 0, 1, \ldots,$ or 7). Therefore, for a current frame under consideration, the best selection for q is the one that maximizes the following probability:

$$P(q|y_n) = \frac{P(y_n|q)P(q)}{P(y_n)}. \qquad (48)$$

According to equation (48), the best selection for q is the q value that maximizes $P(y_n|q)P(q)$. The probabilities of $P(y_n|q)$ and $P(q)$ can be obtained by a histogram technique based on the statistics of the previously processed frames. If the value $H_q(y)$ represents the counts of frames with coded background that follows q frames with skipped background with feature vector y, then:

$$P(y_n|q) = \frac{H_q(y_n)}{\sum_y H_q(y)}, \qquad (49)$$

and P(q) can be obtained by the similar approach.

Figure 8:
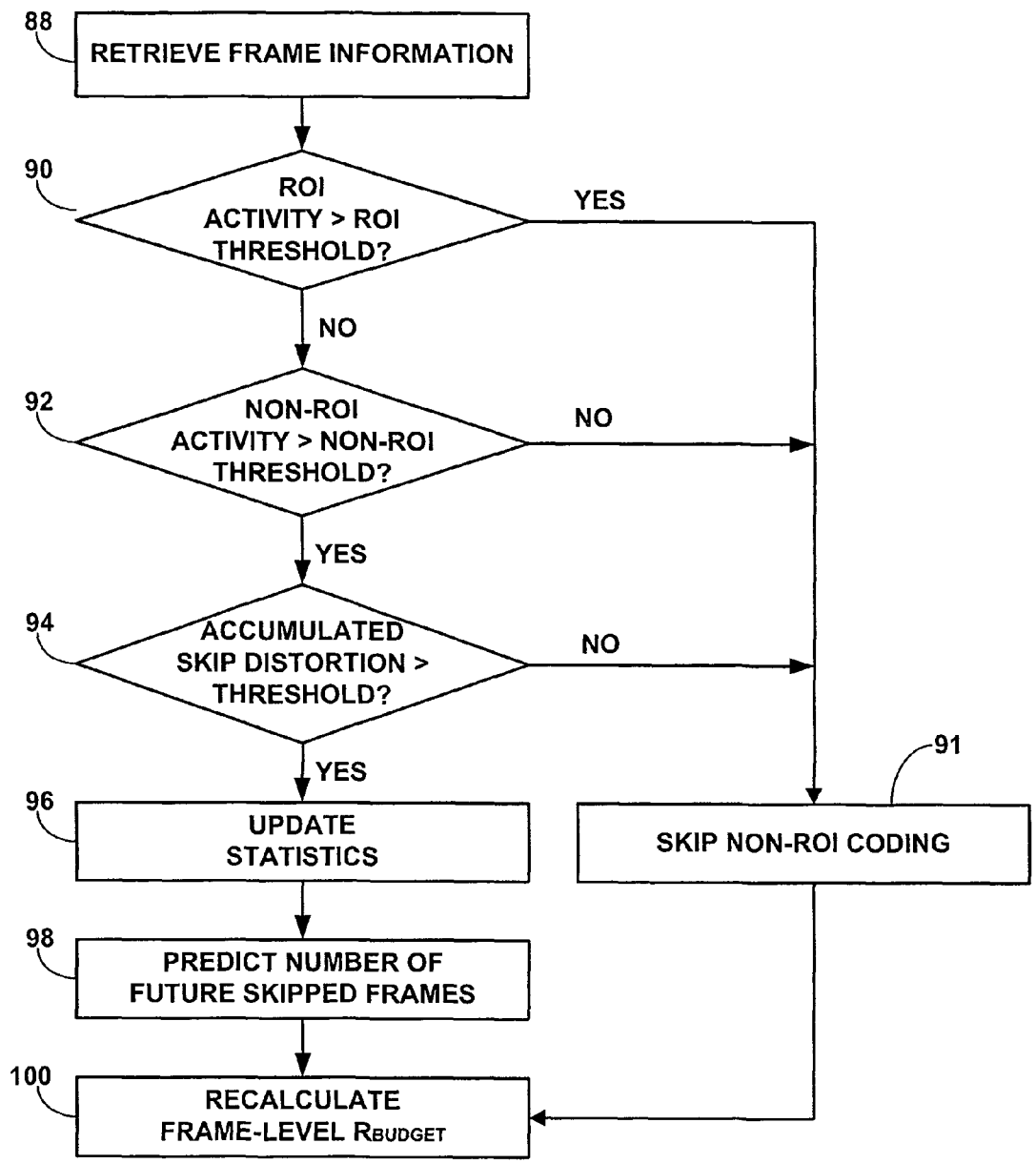
FIG. 8 is a flow diagram illustrating a technique for content-adaptive non-ROI skipping in greater detail.

FIG. 8 is a flow diagram illustrating a technique for content-adaptive non-ROI skipping in greater detail. In particular, FIG. 8 illustrates the operation of non-ROI skipping module 50 and ρ budget adjustment module 61 with the investor strategy. As shown in FIG. 8, upon retrieval of frame information from frame analyzer 60, non-ROI skipping module 50 determines whether content activity in the ROI of the frame exceeds an applicable threshold (90). Again, the term "activity" may generally refer to local activity such as motion, as well as global activity such as shape deformation. If ROI content activity exceeds the threshold, budget adjustment module 61 skips non-ROI coding for the frame (91), and recalculates the ρ domain frame-level budget $R_{BUDGET}$ (100), e.g., in proportion to the number of coding bits recaptured as a result of non-ROI skipping. If ROI content activity exceeds the threshold (90), activity in the ROI is high and requires non-ROI skipping for reallocation of coding bits to ensure acceptable visual quality in the ROI.

If ROI content activity does not exceed the threshold (90), non-ROI skipping module 50 next determines whether content activity in the non-ROI area of the frame exceeds an applicable threshold (92). Content activity in the non-ROI area may include motion as well as texture complexity. If content activity in the non-ROI area does not exceed the applicable threshold, the non-ROI coding can be skipped (91), followed by adjustment of the frame-level budget $R_{BUDGET}$. In this case, non-ROI activity is relatively low. Consequently, skipping non-ROI coding will not severely undermine visual quality in the non-ROI area. At the same time, however, non-ROI skipping may significantly aid ROI coding.

Even if non-ROI content activity is high and exceeds the applicable threshold, the non-ROI area may still be skipped if overall accumulated distortion caused by non-ROI skipping over the course of a video sequence is not high. Accordingly, if accumulated skip distortion does not exceed an applicable threshold (94), the non-ROI coding is skipped (91) by non-ROI skipping module 50, followed by recalculation of the frame-level budget $R_{BUDGET}$ by budget adjustment module 61 (100). Hence, non-ROI skipping module 50 determines whether to skip encoding of a non-ROI area of the video frame based on content activity of the ROI, content activity of the non-ROI area, and accumulated distortion due to skipping of encoding of non-ROI areas in one or more other frames.

If accumulated skip distortion is high (94) and exceeds the applicable threshold, then non-ROI skipping module 50 updates the frame statistics (96) and predicts the number of future skipped frames in the video sequence (98). In this case, the bit allocation between ROI and non-ROI is performed normally, without consideration of non-ROI skipping. The frame statistics may represent the number and pattern of skipped frames within the video sequence, as discussed previously for the investor strategy, e.g., with respect to equations (47)-(49). Budget adjustment module 61 predicts the number of future skipped frames based on the frame statistics (98), e.g., using Bayesian classification. Then, budget adjustment module 61 adjusts the frame budget $R_{BUDGET}$ (100) based on the prediction.

As shown in FIG. 8, the non-ROI skip mode determination may involve analysis of ROI content activity, such as motion or shape deformation, non-ROI content activity, such as motion or texture complexity, and accumulated distortion due to non-ROI skipping in one or more other frames. Although the skip mode decision is depicted in FIG. 8 as a threshold-based decision, it could instead be based on a balancing of ROI activity versus non-ROI activity versus accumulated distortion caused by skipping. Also, although frame-level rate control is described as taking place within the ρ domain, a content-adaptive non-ROI skipping technique as described herein alternatively could be employed in conjunction with QP-based rate control. Accordingly, the process shown in FIG. 8 is exemplary.

Figure 9:
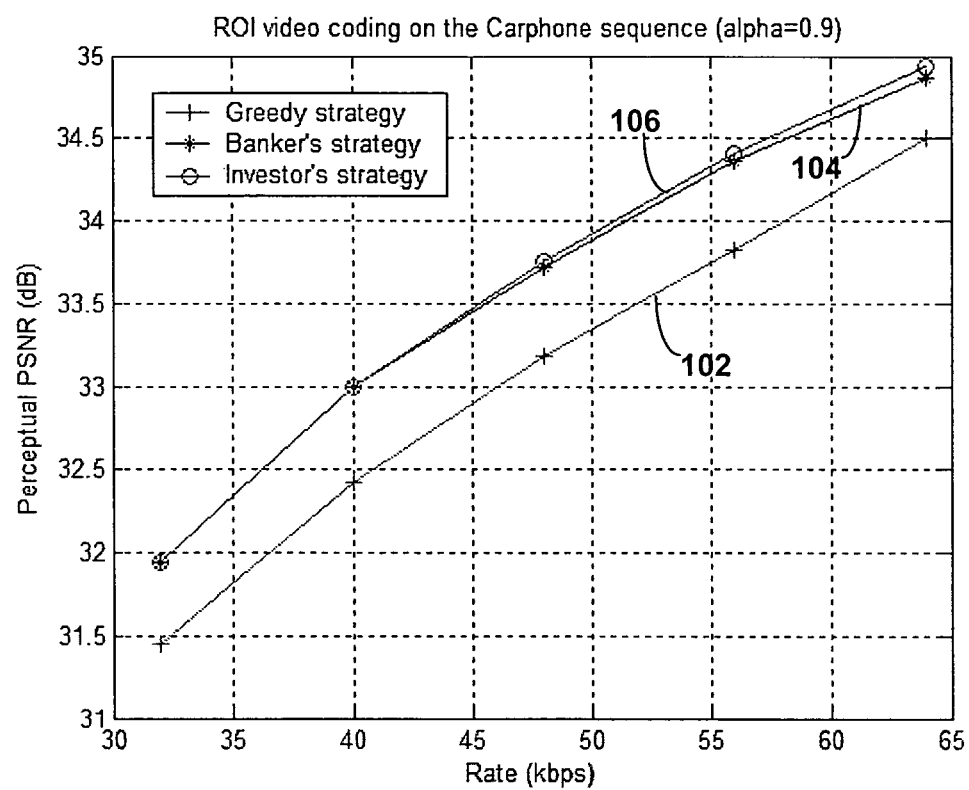
FIG. 9 is a graph comparing overall perceptual quality of encoding techniques using different bit allocation strategies.

FIG. 9 is a graph comparing overall perceptual quality of encoding techniques using different bit allocation strategies. In particular, FIG. 9 compares greedy (102), banker (104) and investor (106) strategies for bit allocation in terms of perceptual peak signal-to-noise ratio (PSNR) in decibels (dBs) over a range of encoding rates in kilobits per second (kbps) for the standard Carphone QCIF video test sequence. In the example of FIG. 9, the user preference value α for purposes of macroblock-level bit allocation is 0.9. The same α value applies to FIGS. 10-12. As shown in FIG. 9, the "investor" strategy slightly outperforms the "banker" strategy at the higher bit rate end. Although it requires extra computational complexity for q estimation, the investor strategy may perform better for video sequences with repeated patterns or self-similarity characteristics.

Experimental results have been obtained for four different rate control approaches using the 15 frame per second (fps) Carphone and Foreman QCIF video test sequences. The Carphone and Foreman sequences are standard test sequences used by those skilled in the art of video coding. The four different rate control approaches are as follows:

1. Greedy. Macroblock-level greedy algorithm where bits are allocated to the macroblocks in a uniformly distributed manner.

2. Frame Skipping. Frame skipping algorithm that skips every other frame during encoding.

3. Unit-Based. Unit-based non-ROI skipping algorithm, as described herein, which groups every two frames into a unit and skips the background of the second frame within each unit.

4. Content-adaptive. Content-adaptive non-ROI skipping algorithm, as described herein, which dynamically determines whether the non-ROI should be skipped, on a frame-by-frame basis, based on frame content and accumulated distortion; the "investor" strategy for bit allocation was used.

Figure 10:
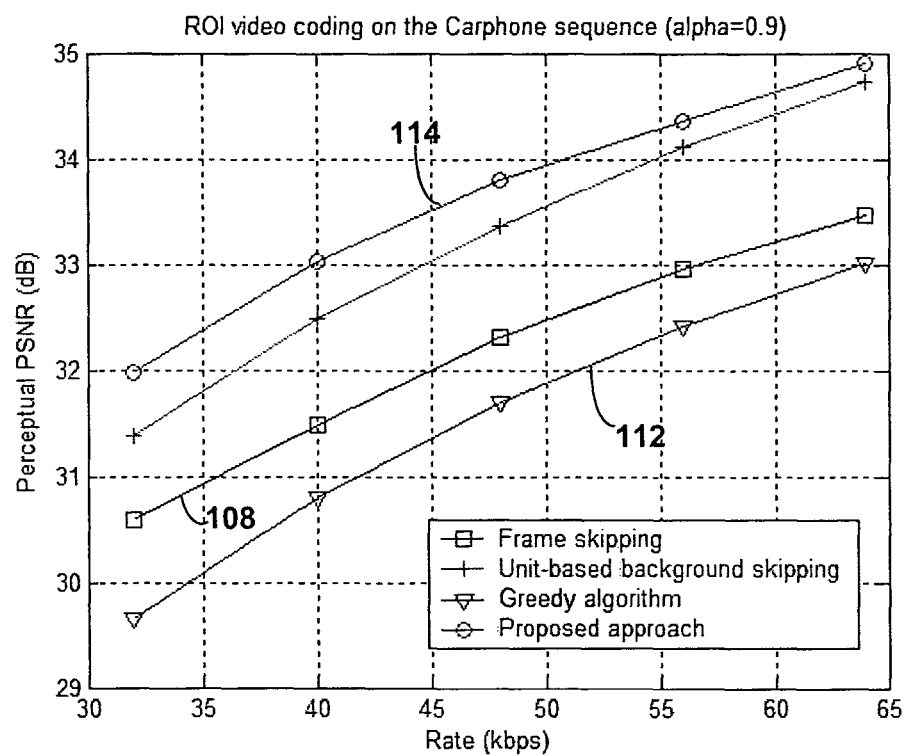
FIG. 10 is a graph comparing overall perceptual quality of encoding techniques using different bit allocation strategies with and without frame and non-ROI skipping for an exemplary video sequence.
Figure 11:
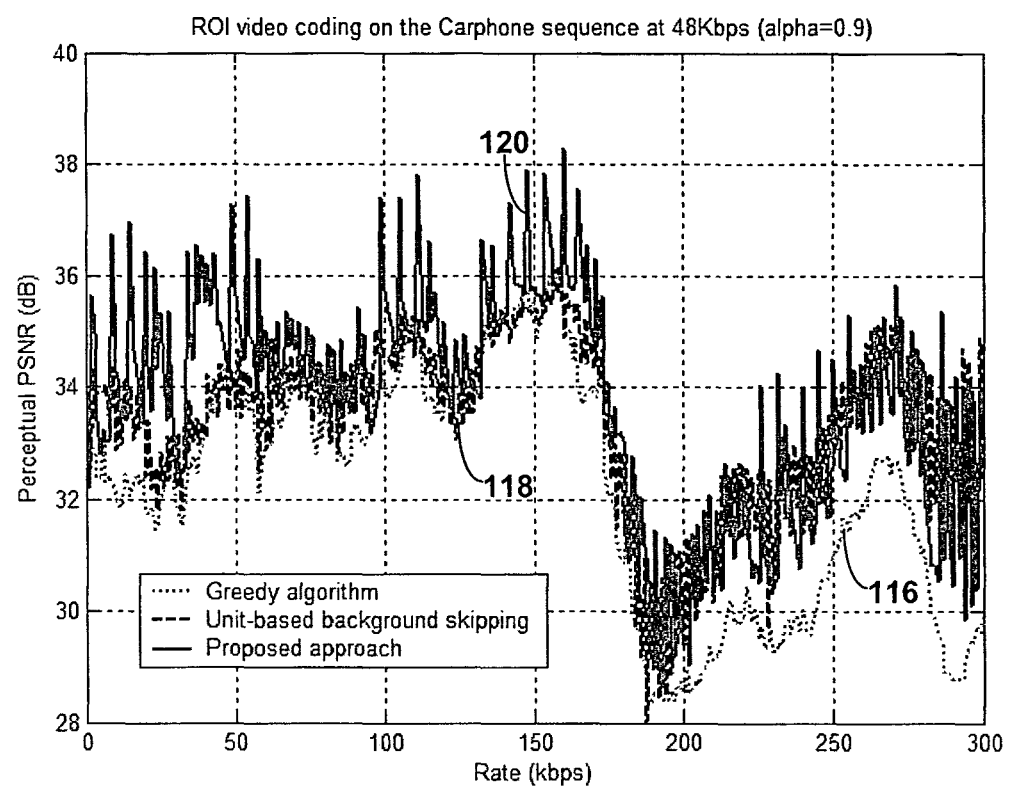
FIG. 11 is a graph illustrating distortion caused by non-ROI skipping and other techniques over an exemplary video sequence.

The first experiment was conducted on the standard Carphone video test sequence, and the results are shown in FIGS. 10 and 11. FIG. 10 is a graph comparing overall perceptual quality of the encoding techniques using different bit allocation strategies with and without frame and non-ROI skipping for the Carphone video test sequence. In FIG. 10, the results for frame skipping, unit-based background skipping, greedy, and content-adaptive ("Proposed approach") are identified by reference numerals 108, 110, 112, and 114, respectively. FIG. 11 is a graph illustrating distortion caused by non-ROI skipping and other techniques over the Carphone video sequence at a rate of 48 Kbps. In FIG. 11, results for greedy, unit-based background skipping, and content-adaptive with investor strategy ("Proposed approach") are designated by reference numerals 116, 118 and 120. As shown in FIGS. 10 and 11, the proposed approach, i.e., content-adaptive non-ROI skipping with the investor strategy, outperformed all other approaches in the entire bit rate range. Notably, the performance gain was up to 2 dB.

Figure 12:
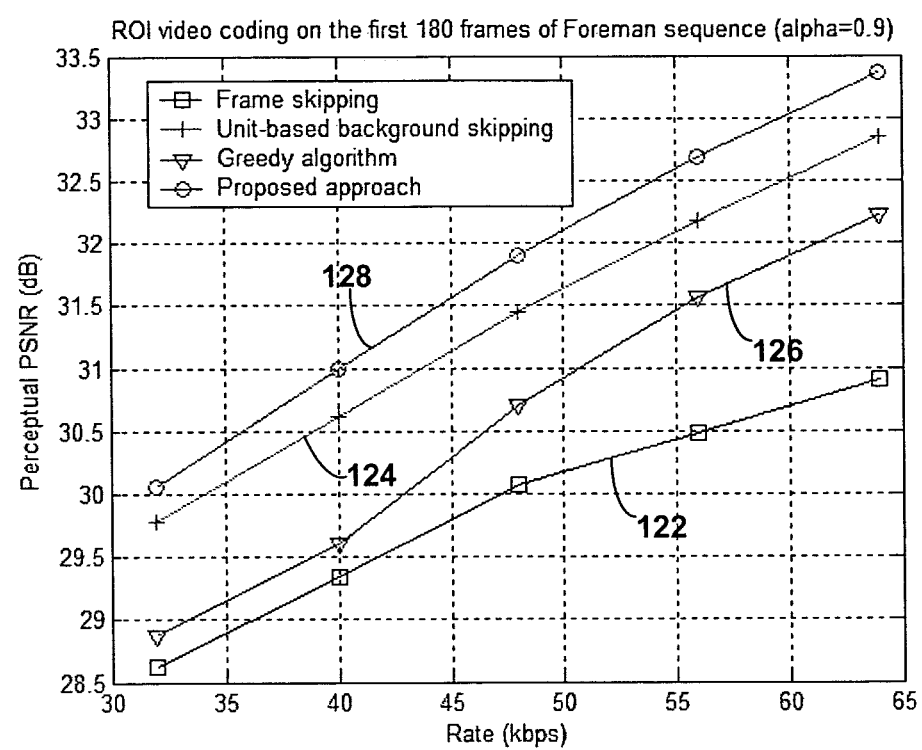
FIG. 12 is a graph comparing overall perceptual quality of encoding techniques using different bit allocation strategies with and without frame and non-ROI skipping for another exemplary video sequence.

FIG. 12 is a graph comparing overall perceptual quality of encoding techniques using different bit allocation strategies with and without frame and non-ROI skipping for another exemplary video sequence, i.e., the first 180 frames of the Foreman QCIF video test sequence, with an α value of 0.9. In FIG. 12, the results for frame skipping, unit-based background skipping, greedy, and content-adaptive ("Proposed approach") are identified by reference numerals 122, 124, 126, and 128, respectively. FIG. 12 shows that the proposed content-adaptive non-ROI skipping with investor strategy bit allocation has a significant gain over the other algorithms.

Figure 13:
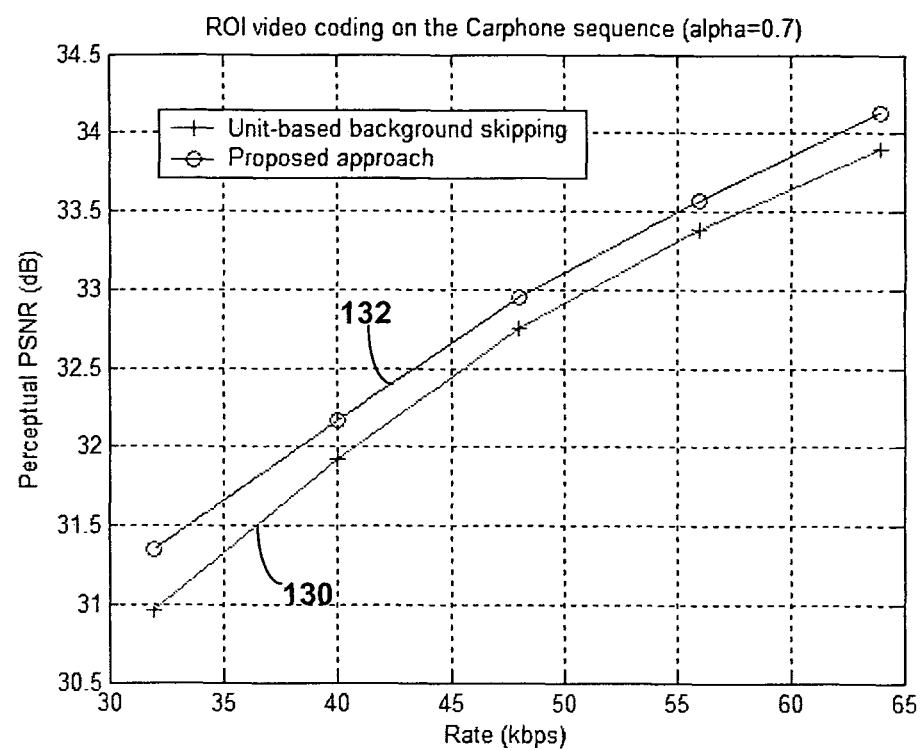
FIG. 13 is a graph comparing overall perceptual quality of encoding techniques using unit-based and content-based non-ROI skipping for an exemplary video sequence.
Figure 14:
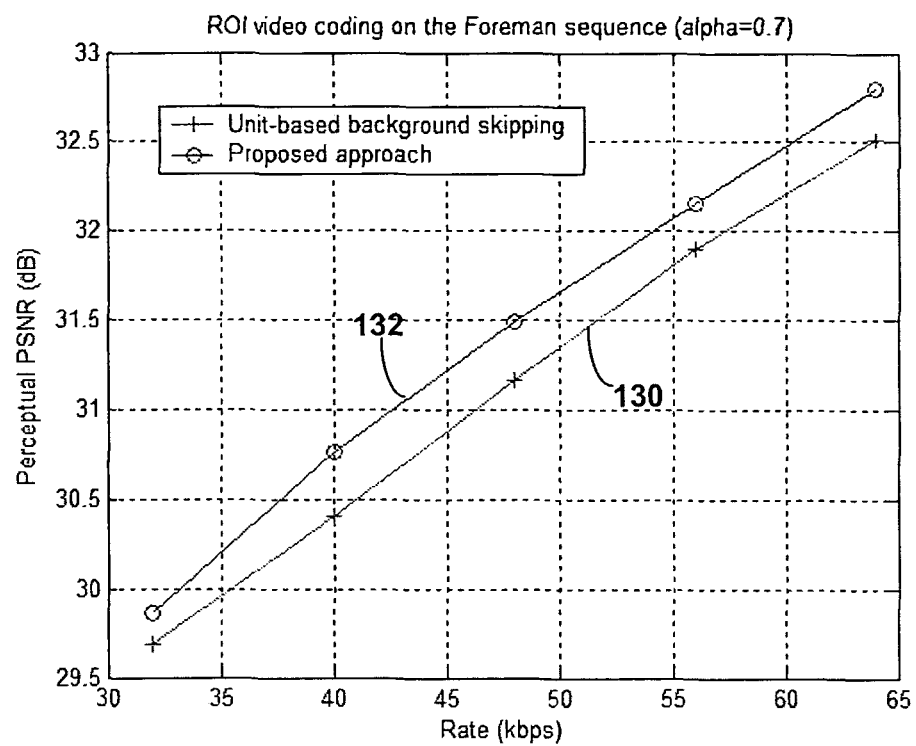
FIG. 14 is a graph comparing overall perceptual quality of encoding techniques using unit-based and content-based non-ROI skipping for another exemplary video sequence.

FIG. 13 is a graph comparing overall perceptual quality of encoding techniques using unit-based and content-based non-ROI skipping for the Carphone video test sequence with an α value of 0.7. FIG. 14 is a graph comparing overall perceptual quality of encoding techniques using unit-based and content-based non-ROI skipping for the Foreman video sequence with an α value of 0.7. In FIGS. 13 and 14, the unit-based non-ROI skipping approach is designated by reference numeral 130, while the content-based non-ROI skipping approach is designated by reference numeral 132. As shown, the content-based non-ROI skipping approach outperforms the unit-based approach.

In this disclosure, various techniques have been described to support ROI coding for video telephony or video streaming applications, especially when presented with very low bit rate requirements, e.g., in wireless video telephony. The disclosure presents a technique for content-adaptive non-ROI skipping, which may be employed in conjunction with different optimized weighted bit allocation schemes, e.g., in the ρ-domain, for ROI video coding to achieve better performance. The content-adaptive non-ROI skipping scheme dynamically determines the non-ROI skip mode based on content information of a current frame, such as content activity of the ROI and non-ROI areas, and statistics of previously processed frames, such as accumulated distortion due to non-ROI skipping in one or more previous frames. In addition, several strategies have been described for better bit allocation in different regions of various frames.

The techniques described herein may be implemented in hardware, software, firmware, or any combination thereof. If implemented in software, the techniques may be realized in part by a computer readable medium comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. In some embodiments, the functionality described herein may be provided within dedicated software modules or hardware units configured for encoding and decoding, or incorporated in a combined video encoder-decoder (CODEC).

Various embodiments have been described. These and other embodiments are within the scope of the following claims.

The invention claimed is:

1. A method for encoding video at an encoding module, comprising:
    obtaining a video frame;
    encoding a region of interest (ROI) and a non-ROI area within the video frame by allocating bits between the ROI and the non-ROI area;
    determining content activity in the ROI;
    determining content activity in the non-ROI area; and
    determining whether to skip encoding of the non-ROI area of the video frame based on a content activity of the ROI, a content activity of the non-ROI area, and an accumulated distortion due to skipping of encoding of non-ROI areas in one or more other video frames,
    wherein encoding of the non-ROI area is skipped when the content activity of the ROI exceeds a first threshold,
    wherein encoding of the non-ROI area is skipped when the content activity of the ROI does not exceed the first threshold and the content activity of the non-ROI area does not exceed a second threshold, and
    wherein encoding of the non-ROI area is skipped when the content activity of the ROI does not exceed the first threshold, the content activity within the non-ROI area exceeds a second threshold, and the accumulated distortion due to skipping of encoding of the other video frames does not exceed a third threshold.

2. The method of claim 1, wherein the content activity of the ROI includes shape deformation and motion in the ROI.

3. The method of claim 1, wherein the content activity of the non-ROI area includes motion and texture complexity in the non-ROI area.

4. The method of claim 1, further comprising allocating encoding bits between the ROI and the non-ROI area when encoding of the non-ROI area is not skipped.

5. The method of claim 4, wherein allocating encoding bits includes allocating the encoding bits based on a frame-level bit budget, the method further comprising adjusting the frame-level bit budget based on historical and predictive skipping statistics for non-ROI areas of the video frame and other video frames.

6. The method of claim 5, further comprising applying a Bayesian model to the historical skipping statistics to obtain the predictive skipping statistics.

7. The method of claim 4, wherein allocating encoding bits includes allocating encoding bits in a ρ-domain at a macroblock level within the video frame.

8. The method of claim 4, wherein allocating encoding bits includes allocating the encoding bits based on a ρ-domain bit budget.

9. The method of claim 8, wherein allocating encoding bits includes applying a bit allocation scheme based on a rate control strategy that determines the ρ-domain bit budget based on a texture complexity of the ROI and non-ROI areas within the frame.

10. The method of claim 8, wherein allocating encoding bits includes applying a bit allocation scheme based on a rate control strategy that estimates future skipping events based on statistics and patterns of non-ROI skipping history over previous frames within a video sequence, and then determines the ρ-domain bit budget based on the estimation.

11. A device comprising:
a region-of-interest mapper that generates a definition of a region of interest (ROI) within a video frame;
a video encoder that encodes the ROI and a non-ROI area within the video frame by allocating bits between the ROI and the non-ROI area; and
a skipping module that determines:
content activity in the ROI;
content activity in the non-ROI area; and
whether the video encoder will skip encoding of the non-ROI area of the video frame based on a content activity of the ROI, a content activity of the non-ROI area, and an accumulated distortion due to skipping of encoding of non-ROI areas in one or more other video frames,
wherein the skipping module directs the video encoder to skip encoding of the non-ROI area when the content activity of the ROI exceeds a first threshold,
wherein the skipping module directs the video encoder to skip encoding of the non-ROI area when the content activity of the ROI does not exceed the first threshold and the content activity of the non-ROI area does not exceed a second threshold, and
wherein the skipping module directs the video encoder to skip encoding of the non-ROI area when the content activity of the ROI does not exceed the first threshold, the content activity within the non-ROI area exceeds a second threshold, and the accumulated distortion due to skipping of encoding of the other video frames does not exceed a third threshold.

12. The device of claim 11, wherein the content activity of the ROI includes shape deformation and motion in the ROI.

13. The device of claim 11, wherein the content activity of the non-ROI area includes motion and texture complexity in the non-ROI area.

14. The device of claim 11, further comprising a bit allocation module that allocates encoding bits between the ROI and the non-ROI area when encoding of the non-ROI area is not skipped.

15. The device of claim 14, wherein the bit allocation module allocates the encoding bits based on a frame-level bit budget, the device further comprising a budget adjustment module that adjusts the frame-level bit budget based on historical and predictive skipping statistics for non-ROI areas of the video frame and other video frames.

16. The device of claim 15, wherein the budget adjustment module applies a Bayesian model to the historical skipping statistics to obtain the predictive skipping statistics.

17. The device of claim 14, wherein the bit allocation module allocates encoding bits in a ρ-domain at the macroblock level within the video frame.

18. The device of claim 14, wherein the bit allocation module allocates the encoding bits based on a ρ-domain bit budget.

19. The device of claim 18, wherein the bit allocation module applies a bit allocation scheme based on a rate control strategy that determines the ρ-domain budget based on a texture complexity of the ROI and non-ROI areas within the frame.

20. The device of claim 18, wherein the bit allocation module applies a bit allocation scheme based on a rate control strategy that estimates future skipping events based on statistics and patterns of non-ROI skipping history over previous frames within a video sequence, and then determines the ρ-domain bit budget based on the estimation.

21. A non-transitory computer-readable medium encoded with a computer program comprising instructions to cause a processor to:
obtain a video frame;
encode a region of interest (ROI) and a non-ROI area within the video frame by allocating bits between the ROI and non-ROI area;
determine content activity in the ROI;
determine content activity in the non-ROI area; and
determine whether to skip encoding of the non-ROI area of the video frame based on a content activity of the ROI, a content activity of the non-ROI area, and an accumulated distortion due to skipping of encoding of non-ROI areas in one or more other video frames,
wherein encoding of the non-ROI area is skipped when the content activity of the ROI exceeds a first threshold,
wherein encoding of the non-ROI area is skipped when the content activity of the ROI does not exceed the first threshold and the content activity of the non-ROI area does not exceed a second threshold, and
wherein encoding of the non-ROI area is skipped when the content activity of the ROI does not exceed the first threshold, the content activity within the non-ROI area exceeds a second threshold, and the accumulated distortion due to skipping of encoding of the other video frames does not exceed a third threshold.

22. The non-transitory computer-readable medium of claim 21, wherein the content activity of the ROI includes shape deformation and motion in the ROI.

23. The non-transitory computer-readable medium of claim 21, wherein the content activity of the non-ROI area includes motion and texture complexity in the non-ROI area.

24. The non-transitory computer-readable medium of claim 21, wherein the instructions cause the processor to allocate encoding bits between the ROI and the non-ROI area when encoding of the non-ROI area is not skipped.

25. The non-transitory computer-readable medium of claim 24, wherein the instructions cause the processor to allocate encoding bits based on a frame-level bit budget, and adjust the frame-level bit budget based on historical and predictive skipping statistics for non-ROI areas of the video frame and other video frames.

26. The non-transitory computer-readable medium of claim 25, wherein the instructions cause the processor to apply a Bayesian model to the historical skipping statistics to obtain the predictive skipping statistics.

27. The non-transitory computer-readable medium of claim 24, wherein the instructions cause the processor to allocate encoding bits in a ρ-domain at a macroblock level within the video frame.

28. The non-transitory computer-readable medium of claim 24, wherein the instructions cause the processor to allocate the encoding bits based on a ρ-domain bit budget.

29. The non-transitory computer-readable medium of claim 28, wherein the instructions cause the processor to apply a bit allocation scheme based on a rate control strategy that determines the ρ-domain bit budget based on a texture complexity of the ROI and non-ROI areas within the frame.

30. The non-transitory computer-readable medium of claim 28, wherein the instructions cause the processor to apply a bit allocation scheme based on a rate control strategy that estimates future skipping events based on statistics and patterns of non-ROI skipping history over previous frames within a video sequence, and then determines the p-domain bit budget based on the estimation.

31. A device comprising:
- a region-of-interest mapping means that generates a definition of a region of interest (ROI) within a video frame;
- a video encoding means that encodes the ROI and a non-ROI area within the video frame by allocating bits between the ROI and the non-ROI area; and
- a skipping means that determines:
  - content activity in the ROI;
  - content activity in the non-ROI area; and
  - whether the video encoding means will skip encoding of the non-ROI area of the video frame based on a content activity of the ROI, a content activity of the non-ROI area, and an accumulated distortion due to skipping of encoding of non-ROI areas in one or more other video frames,
- wherein the skipping means directs the video encoding means to skip encoding of the non-ROI area when the content activity of the ROI exceeds a first threshold,
- wherein the skipping means directs the video encoding means to skip encoding of the non-ROI area when the content activity of the ROI does not exceed the first threshold and the content activity of the non-ROI area does not exceed a second threshold, and
- wherein the skipping means directs the video encoding means to skip encoding of the non-ROI area when the content activity of the ROI does not exceed the first threshold, the content activity within the non-ROI area exceeds a second threshold, and the accumulated distortion due to skipping of encoding of the other video frames does not exceed a third threshold.

\* \* \* \* \*